(12) United States Patent
Tian

(10) Patent No.: US 11,535,368 B2
(45) Date of Patent: Dec. 27, 2022

(54) VERTICAL TAKEOFF AND LANDING AERIAL VEHICLE

(71) Applicant: Shanghai Autoflight Co., Ltd., Shanghai (CN)

(72) Inventor: Yu Tian, Hong Kong (CN)

(73) Assignee: SHANGHAI AUTOFLIGHT CO., LTD., Shanghai (CN)

(*) Notice: Subject to any disclaimer, the term of this patent is extended or adjusted under 35 U.S.C. 154(b) by 0 days.

(21) Appl. No.: 17/396,709

(22) Filed: Aug. 8, 2021

(65) Prior Publication Data

US 2022/0041272 A1 Feb. 10, 2022

(30) Foreign Application Priority Data

Aug. 7, 2020 (CN) .......................... 202021631677.2
Oct. 29, 2020 (CN) .......................... 202022450874.0

(51) Int. Cl.
*B64C 27/26* (2006.01)
*B64C 27/28* (2006.01)
*B64C 39/02* (2006.01)

(52) U.S. Cl.
CPC .............. *B64C 27/28* (2013.01); *B64C 27/26* (2013.01); *B64C 39/024* (2013.01); *B64C 2201/021* (2013.01); *B64C 2201/027* (2013.01); *B64C 2201/104* (2013.01); *B64C 2201/108* (2013.01)

(58) Field of Classification Search
CPC ................................................. B64C 29/0025
See application file for complete search history.

(56) References Cited

U.S. PATENT DOCUMENTS

| | | | | |
|---|---|---|---|---|
| 6,293,491 | B1* | 9/2001 | Wobben | B64D 27/24 244/17.23 |
| 10,322,814 | B1* | 6/2019 | Tian | B64C 39/04 |
| 2006/0151666 | A1* | 7/2006 | VanderMey | B64C 29/0016 244/12.3 |
| 2015/0028151 | A1* | 1/2015 | Bevirt | B64C 23/065 244/6 |
| 2019/0127056 | A1* | 5/2019 | Weekes | B64C 27/26 |
| 2019/0233098 | A1* | 8/2019 | Tian | B64C 11/46 |
| 2020/0269975 | A1* | 8/2020 | Fink | B64C 27/26 |
| 2020/0354048 | A1* | 11/2020 | Melo | B64C 39/08 |
| 2020/0407055 | A1* | 12/2020 | Mores | B64C 39/068 |
| 2021/0197965 | A1* | 7/2021 | Kunz | B64C 29/0025 |
| 2021/0206483 | A1* | 7/2021 | Lee | B64C 29/0033 |
| 2021/0229825 | A1* | 7/2021 | Eppink | B64C 11/00 |
| 2021/0253234 | A1* | 8/2021 | Tao | B64C 29/0025 |

* cited by examiner

*Primary Examiner* — Tye William Abell
(74) *Attorney, Agent, or Firm* — WPAT Law, P.C.; Anthony King

(57) ABSTRACT

A vertical takeoff and landing aerial vehicle. A left linear support and a right linear support of the unmanned aerial vehicle are respectively provided with a first group of multiple lift propellers and a second group of lift propellers, and the aerial vehicle is provided with a left dorsal fin and a right dorsal fin. By arranging a plurality of lift propellers, a left dorsal fin, and a right dorsal fin on the vertical takeoff and landing aerial vehicle provided by the disclosure, the aerial vehicle is higher in stability in the flight process.

13 Claims, 21 Drawing Sheets

VERTICAL TAKEOFF AND LANDING AERIAL VEHICLE

TECHNICAL FIELD

The disclosure relates to the technology of unmanned aerial vehicles, and in particular to a vertical takeoff and landing unmanned aerial vehicle.

BACKGROUND

The unmanned aerial vehicle is an unmanned aerial vehicle controlled by using radio remote control equipment and a self-contained program control device, and compared with a manned aircraft, the unmanned aerial vehicle is more suitable for complex and dangerous environments and is widely applied to various fields.

An existing vertical takeoff and landing (VTOL) unmanned aerial vehicle generally adopts a layout form with four lift motors and one thrust motor, the lift motors drive lift propellers to rotate, for example, the lift propellers are arranged above a linear support, and the unmanned aerial vehicle is driven by the rotation of the lift propellers to take off and land vertically. A thrust motor drives a propulsion propeller which is arranged at the rear end of the unmanned aerial vehicle, and the unmanned aerial vehicle is propelled to fly forwards by a thrust force generated by the rotation of the propulsion propeller.

However, the unmanned aerial vehicle is poor in stability when encountering fluctuation of air in the flight process.

SUMMARY

The disclosure relates to a vertical takeoff and landing unmanned aerial vehicle which is used for solving the problem that the unmanned aerial vehicle is poor in stability when encountering fluctuation of air in the flight process.

The disclosure provides a vertical takeoff and landing unmanned aerial vehicle, which comprises:
  a left main wing and a right main wing;
  a left front wing and a right front wing;
  a main body which is engaged with the left main wing and the right main wing;
  a left linear support which is engaged with the left main wing;
  a right linear support which is engaged with the ring main wing;
  a left dorsal fin which is arranged on the left linear support;
  and a right dorsal fin which is arranged on the right linear support.

In one embodiment of the disclosure, the left dorsal fin is obliquely arranged towards the front end of the left linear support, and a length of the top end of the left dorsal fin is less than that of the bottom end of the left dorsal fin;
  the right dorsal fin is obliquely arranged towards the front end of the right linear support, and a length of the top end of the right dorsal fin is less than that of the bottom end of the right dorsal fin.

In one embodiment, the tops of the left linear support and the right linear support are respectively provided with a plurality of lift propellers; the left dorsal fin is located between two adjacent lift propellers at the top of the left linear support, and the right dorsal fin is located between two adjacent lift propellers at the top of the right linear support;
  the tops of the left dorsal fin and the right dorsal fin are respectively provided with an additional lift propeller; and the additional lift propellers and the lift propellers are designed to be redundant with each other.

In one embodiment, the tail end of the right linear support is provided with a right propulsion propeller, and the left propulsion propeller and the right propulsion propeller are designed to be redundant with each other.

The disclosure provides a vertical takeoff and landing unmanned aerial vehicle, which comprises:
  a left main wing and a right main wing;
  a left front wing and a right front wing;
  a main body which is engaged with the left main wing and the right main wing;
  a left linear support which is engaged with the left main wing;
  a right linear support which is engaged with the ring main wing;
  wherein the left linear support has a first group of multiple lift propellers arranged thereon;
  wherein the right linear support has a second group of multiple lift propellers arranged thereon;
  a left dorsal fin which is arranged between any two lift propellers in the first group of multiple lift propellers on the left linear support; and
  a right dorsal fin which is arranged between any two lift propellers in the second group of multiple lift propellers on the right linear support.

In one embodiment of the disclosure, the unmanned aerial vehicle further comprises at least one propulsion propeller which is arranged at the tail end of the unmanned aerial vehicle, wherein a rotating shaft of each propulsion propeller of the at least one propulsion propeller is parallel to the longitudinal axis of the unmanned aerial vehicle.

In one embodiment of the disclosure, the unmanned aerial vehicle comprises two propulsion propellers, one of the two propulsion propellers is arranged at the tail end of the left linear support, and the other one is arranged at the tail end of the right linear support.

In one embodiment of the disclosure, each of the left dorsal fin and the right dorsal fin has an additional lift propeller arranged thereon.

In one embodiment of the disclosure, the additional lift propellers arranged on the left dorsal fin and the right dorsal fin are arranged at the tail ends of the tops of the left dorsal fin and the right dorsal fin respectively.

In one embodiment of the disclosure, base portions of the left dorsal fin and the right dorsal fin at least partially overlap with the left main wing and the right main wing respectively.

In one embodiment of the disclosure, each of the left dorsal fin and the right dorsal fin has a backward inclined plane.

In one embodiment of the disclosure, the additional lift propeller arranged on each of the left dorsal fin and the right dorsal fin has a rotation coverage area, and the rotation coverage area partially overlaps with a rotation coverage area of the lift propeller which is immediately behind the respective dorsal fin and arranged on the corresponding left linear support and right linear support.

In one embodiment of the disclosure, the unmanned aerial vehicle is integrally formed by a mold.

The disclosure further provides a vertical takeoff and landing unmanned aerial vehicle, which comprises:
  a left main wing and a right main wing;
  a left front wing and a right front wing;
  a main body which is engaged with the left main wing and the right main wing;
  a left linear support which is engaged with the left main wing;

a right linear support which is engaged with the right main wing;

a first group of multiple lift propellers which are arranged on the left linear support;

a second group of multiple lift propellers which are arranged on the right linear support, wherein the first group of multiple lift propellers and the second group of multiple lift propellers are arranged on the same first horizontal plane;

a left additional lift propeller which is arranged on a second horizontal plane higher than the first horizontal plane;

and a right additional lift propeller which is arranged on the second horizontal plane.

In one embodiment of the disclosure, the unmanned aerial vehicle further comprises a left dorsal fin engaged with the left linear support, and the left additional lift propeller is arranged on the top tail end of the left dorsal fin.

In one embodiment of the disclosure, the first group of multiple lift propellers and the left additional lift propeller are arranged in a straight line.

In one embodiment of the disclosure, the left additional lift propeller has a rotation coverage area, and the rotation coverage area partially overlaps with a rotation coverage area of another lift propeller in the first group of multiple lift propellers.

In one embodiment of the disclosure, the unmanned aerial vehicle further comprises a propulsion propeller which is arranged on the tail end of each of the left linear support and the right linear support.

In one embodiment of the disclosure, the unmanned aerial vehicle is not provided with other lift propellers except the first group of multiple lift propellers, the second group of multiple lift propellers, the left additional lift propeller, and the right additional lift propeller.

The disclosure provides a vertical takeoff and landing unmanned aerial vehicle, which comprises: a left main wing and a right main wing; a left front wing and a right front wing; a main body which is engaged with the left main wing and the right main wing; a left linear support which is engaged with the left main wing; a right linear support which is engaged with the right main wing; a left dorsal fin which is arranged on the left linear support; and a right dorsal fin which is arranged on the right linear support. According to the vertical takeoff and landing unmanned aerial vehicle provided by the disclosure, the left dorsal fin is arranged on the left linear support, the right dorsal fin is arranged on the right linear support, the left dorsal fin and the right dorsal fin play a role of a stabilizer in the flight process of the unmanned aerial vehicle, and thus the stability of the unmanned aerial vehicle in the flight process is improved.

Although this specification comprises many specific implementation details, these should not be construed as limitations on the scope of any disclosure or of what may be claimed, but rather as descriptions specific to the features of implementations of embodiments. Certain features that are described in the context of different implementations in this specification may also be implemented in combination in a separate implementation. In contrast, various features described in the context of the separate implementation may also be implemented in multiple implementations separately or in any appropriate sub-combination. In addition, although the features may be described above and below as acting in certain combinations and even initially described as such, one or more features from a described/claimed combination may be excised from the combination in certain cases, and the described/claimed combination may be directed to a sub-combination or variations of the sub-combination.

Many implementations have been described. However, it should be understood that various modifications may be made without departing from the spirit and scope of the disclosure. For example, the example operations, methods, or processes described herein may comprise more steps or less steps than those described. In addition, the steps in these example operations, methods, or processes may be performed in different alternative ways than those described or illustrated in the figures.

The details of one or more implementations of a subject matter described in the disclosure are set forth in the accompanying drawings and the description below. Other features, aspects and advantages of the subject matter will become apparent in accordance with the specification, the accompanying drawings, and the technical solutions of the specification.

BRIEF DESCRIPTION OF THE DRAWINGS

It should be noted that the accompanying drawings may be in simplified form and may not be precise in scale. With reference to the disclosure herein, for purposes of convenience and clarity only, directional terms such as top, bottom, left, right, up, down, upper side, above, beneath, below, rear portion, front portion, distal end, and proximal end are used with reference to the accompanying drawings. These directional terms should not be construed to limit the scope of the embodiments in any way.

Where reference is made to components with reference numerals, like parts are denoted by the same reference numerals throughout the accompanying drawings of the specification.

Figure 1A:
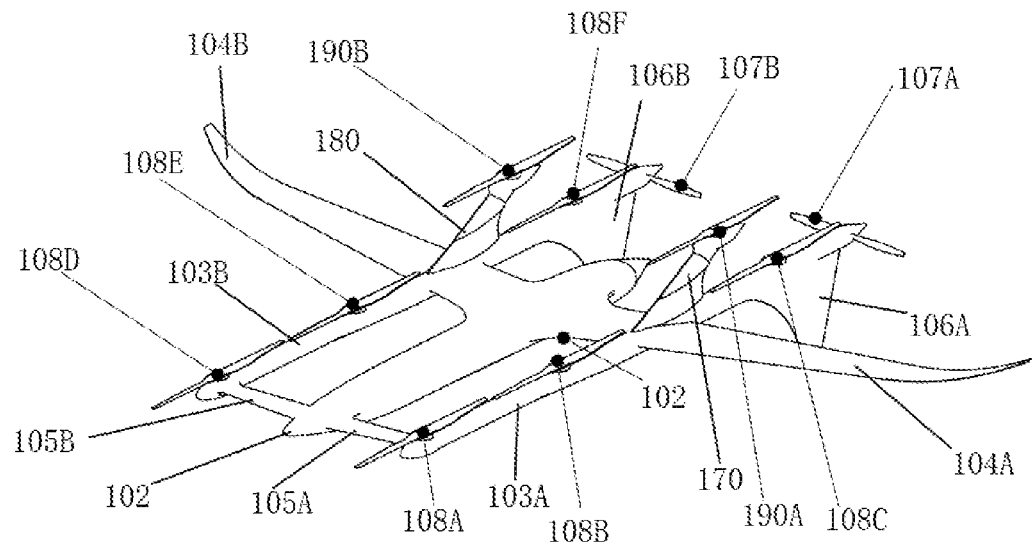
FIG. 1a is a top perspective view of an embodiment of a VTOL unmanned aircraft system in accordance with one aspect of an embodiment.

100—unmanned aerial vehicle; 101—flight platform; 102—main body; 103A—left linear support; 103B—right linear support; 104A—left main wing; 104B—right main wing; 105A—left front wing; 105B—right front wing; 106A—left vertical stabilizer; 106B—right vertical stabilizer; 107—propulsion propeller; 107A—left propulsion propeller; 107B—right propulsion propeller; 108A—first lift propeller; 108B—second lift propeller; 108C—third lift propeller; 108D—fourth lift propeller; 108E—fifth lift propeller; 108F—sixth lift propeller; 109A—left wingtip propeller; 109B—right wingtip propeller; 110A—left wingtip vertical stabilizer; 110B—right wingtip vertical stabilizer; 111A—left folding leg; 111B—right folding leg; 112A—first leaf spring; 112B—second leaf spring; 112C—third leaf spring; 112D—fourth leaf spring; 116—vertical expander; 117—central propulsion propeller; 130—cargo pod; 135A—first pod leaf spring; 135B—second pod leaf spring; 135C—third pod leaf spring; 135D—fourth pod leaf spring; 140—passenger pod; 145A—pod leg; 145B—pod leg; 145C—pod leg; 145D-pod leg; 147—pod-attaching latch; 148—electric wheel; 149—shell; 150—energy storage unit in flight platform; 155—energy storage unit in pod; 160—flotation device; 170—left dorsal fin; 180—right dorsal fin; 190A—additional lift propeller; 190B—additional lift propeller; 120—aileron.

DETAILED DESCRIPTION OF THE EMBODIMENTS

Different aspects of various embodiments may now be better understood by turning to the following detailed description of the embodiments, which are presented as illustrative examples of the embodiments defined in the technical solutions. It is expressly understood that the embodiments defined by the technical solutions may be broader than the illustrated embodiments described below.

The words used in the specification to describe the various embodiments should be understood to not only have commonly defined meanings thereof, but, in structures, materials, or actions in the specification, to include special definitions beyond the scope of the generally defined meanings. Hence, if a component may be understood in the context of the specification to include more than one meaning, its use in the technical solution must be understood to be general for all possible meanings supported by the specification and the words themselves.

The term "unmanned aerial vehicle" is defined as a flight transportation system with at least one propeller as one propulsion source. The term "unmanned aerial vehicle" may comprise both "manned" and "unmanned" flight transportation systems. The "manned" unmanned aerial vehicle may refer to a flight transportation system that carries human passengers, none of which has right of control over the unmanned aerial vehicle. The "manned" unmanned aerial vehicle may also refer to a flight transportation system that carries human passengers, with some or one of the human passengers having a certain right of control over the unmanned aerial vehicle.

As the background, an existing unmanned aerial vehicle is poor in stability when encountering fluctuation of air in the flight process. To solve the problem, the disclosure provides a vertical takeoff and landing unmanned aerial vehicle, which comprises: a left main wing and a right main wing; a left front wing and a right front wing; a main body which is engaged with the left main wing and the right main wing; a left linear support which is engaged with the left main wing; a right linear support which is engaged with the ring main wing; a left dorsal fin which is arranged on the left linear support; and a right dorsal fin which is arranged on the right linear support. The left dorsal fin and the right dorsal fin play a role of a stabilizer in the flight process of the unmanned aerial vehicle, that is, the sectional area of the unmanned aerial vehicle in a vertical direction is increased to improve the stability of the unmanned aerial vehicle in the flight process.

The technical solutions of the disclosure will be described below in detail in conjunction with specific accompanying drawings.

Figure 1B:
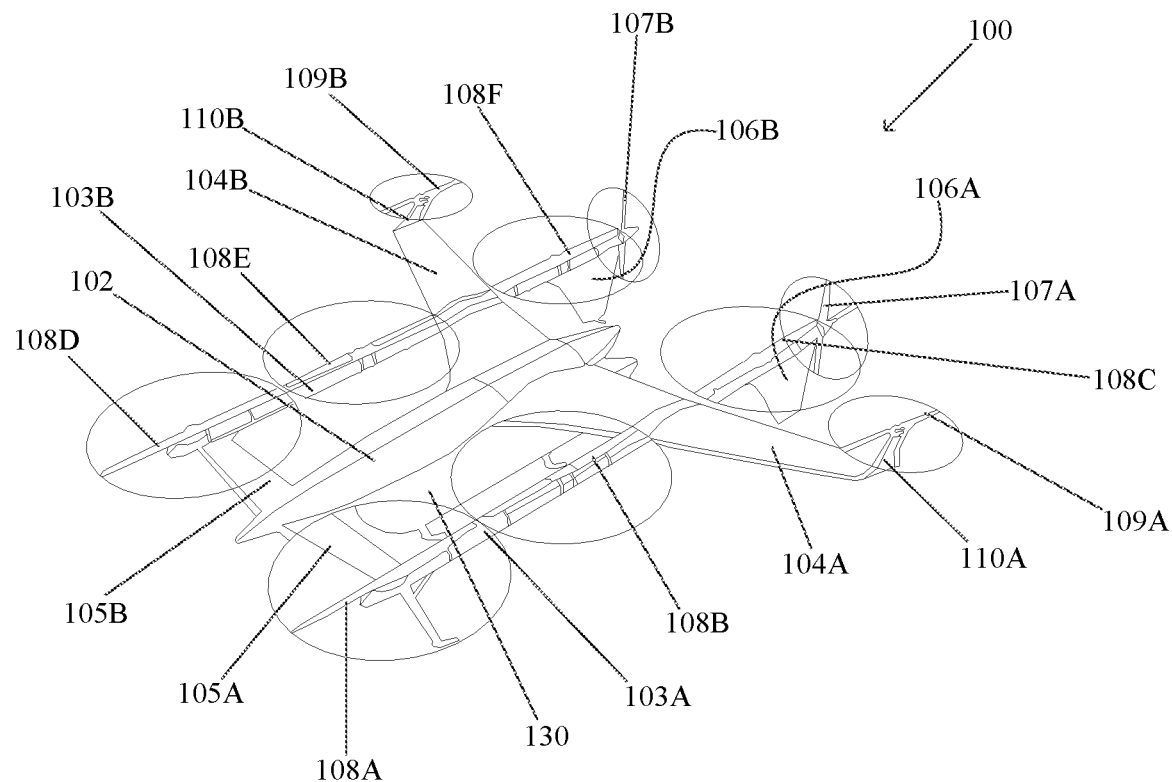
FIG. 1b is a top perspective view of an embodiment of a VTOL unmanned aircraft system in accordance with still another aspect of an embodiment.
Figure 2:
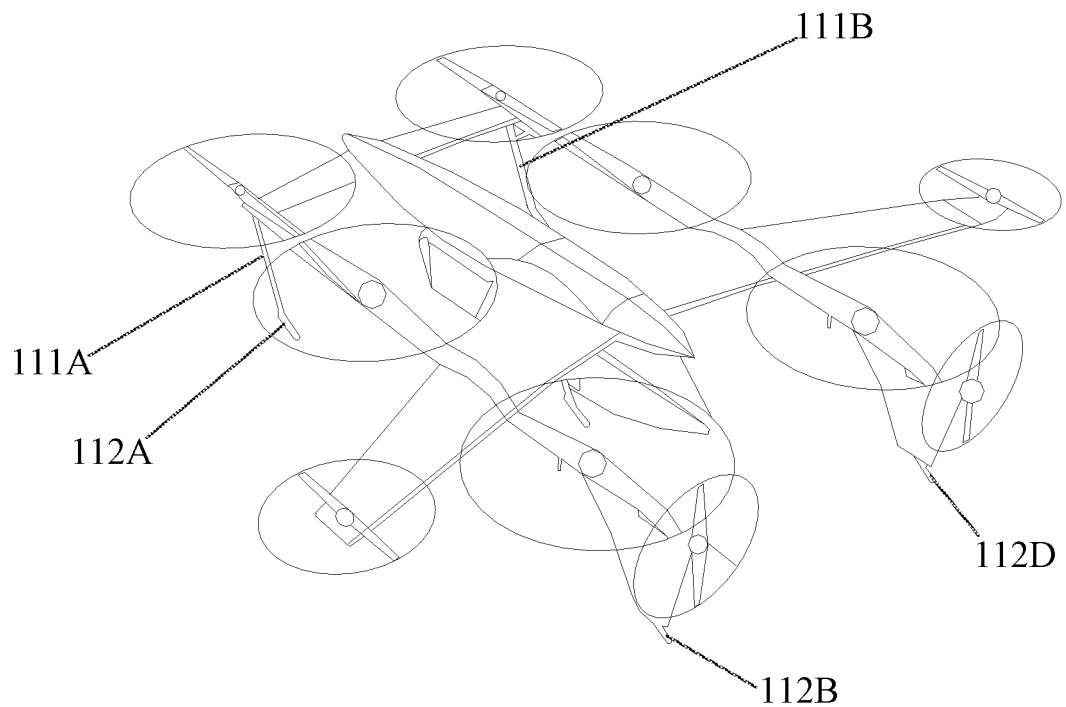
FIG. 2 is a top rear perspective view of the unmanned aircraft system of FIG. 1b.
Figure 3:
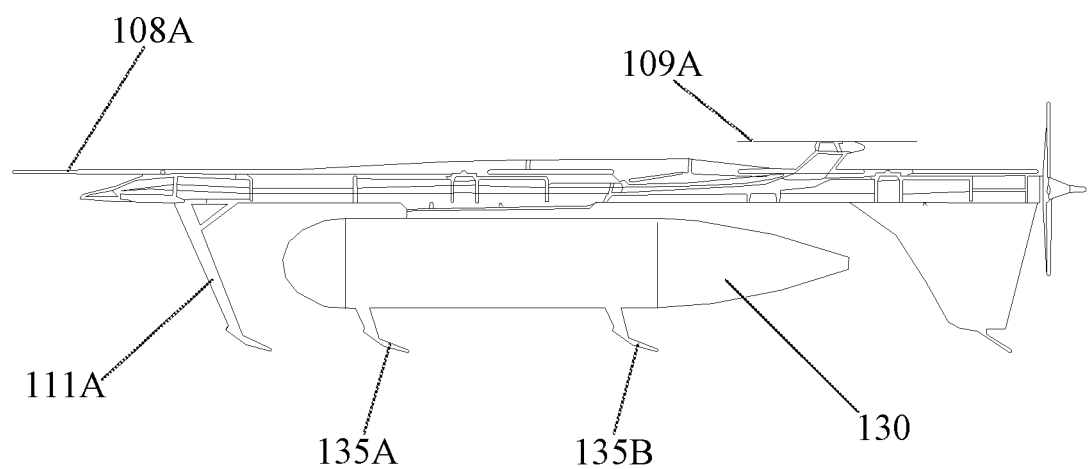
FIG. 3 is a side view of the unmanned aircraft system of FIG. 1b.
Figure 4:
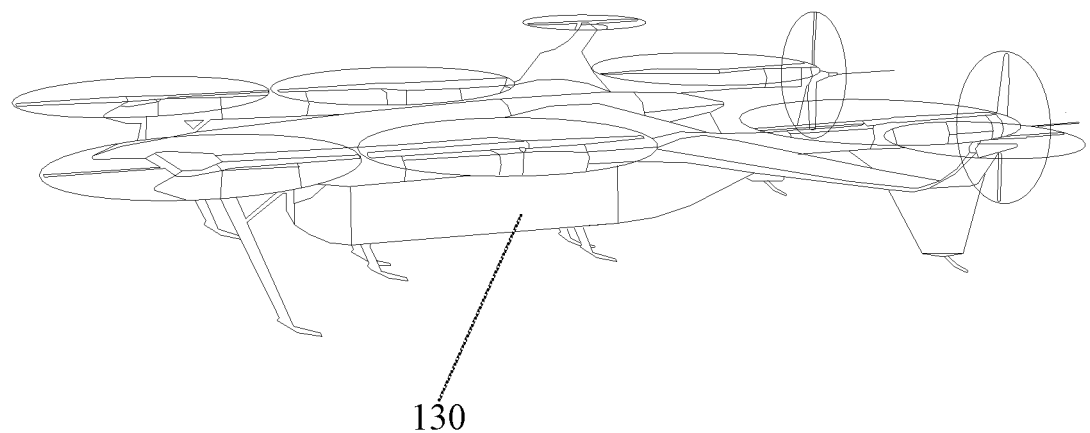
FIG. 4 is a top perspective view of another embodiment of a VTOL unmanned aircraft system with a flight platform and a detachably attached pod in accordance with one aspect of the embodiment.
Figure 5:
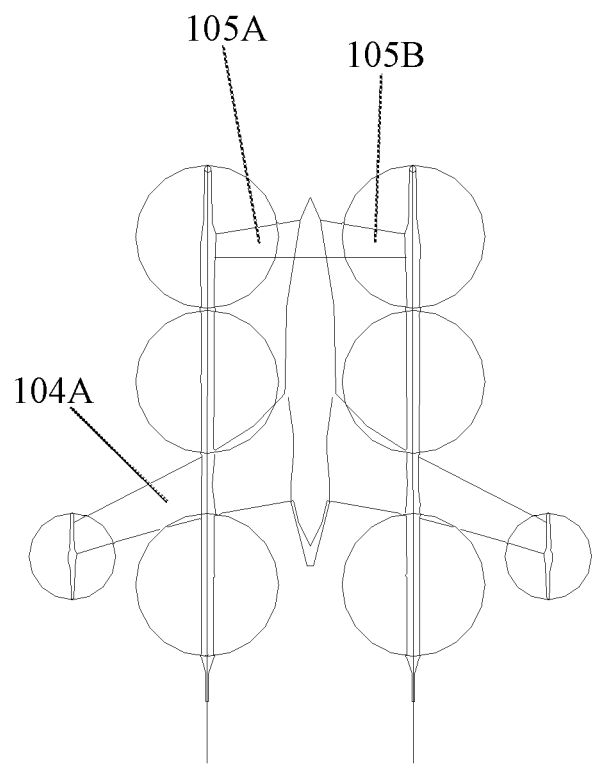
FIG. 5 is a top view of the unmanned aircraft system of FIG. 4 in accordance with one aspect of the embodiment.
Figure 6:
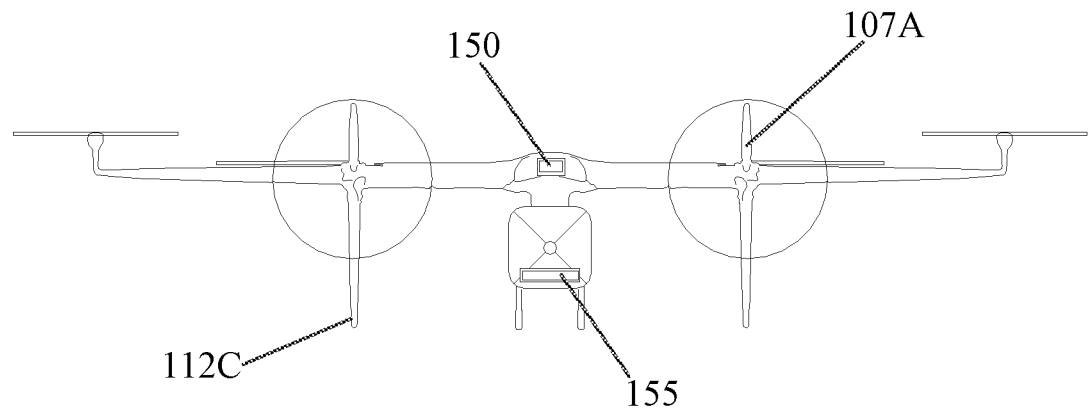
FIG. 6 is a front view of the unmanned aircraft system of FIG. 4 in accordance with one aspect of the embodiment.
Figure 7:
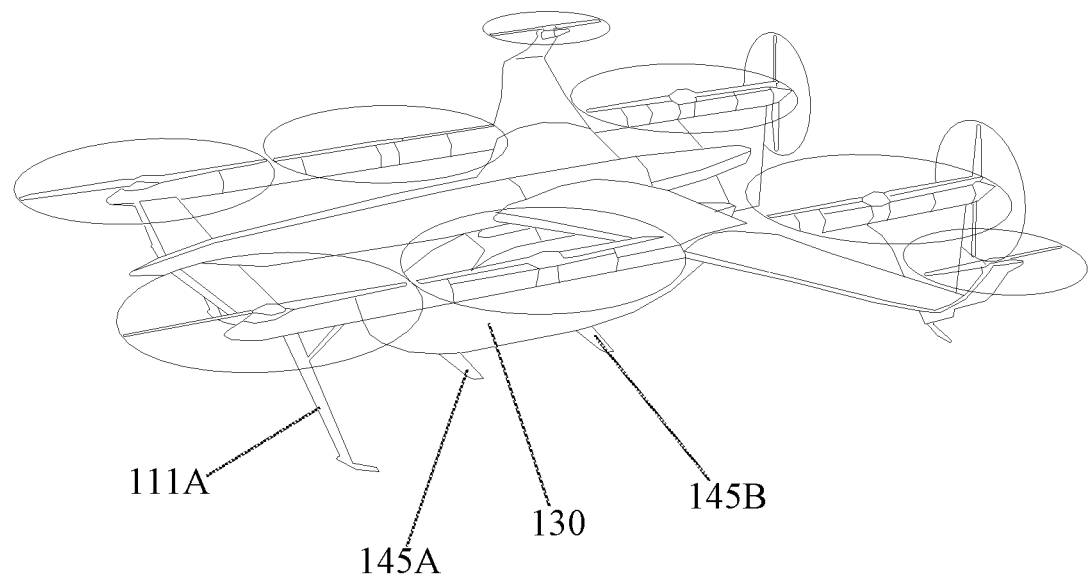
FIG. 7 is a top perspective view of an embodiment of a VTOL unmanned aircraft system with a flight platform and a detachably attached passenger pod in accordance with one aspect of the embodiment.
Figure 8:
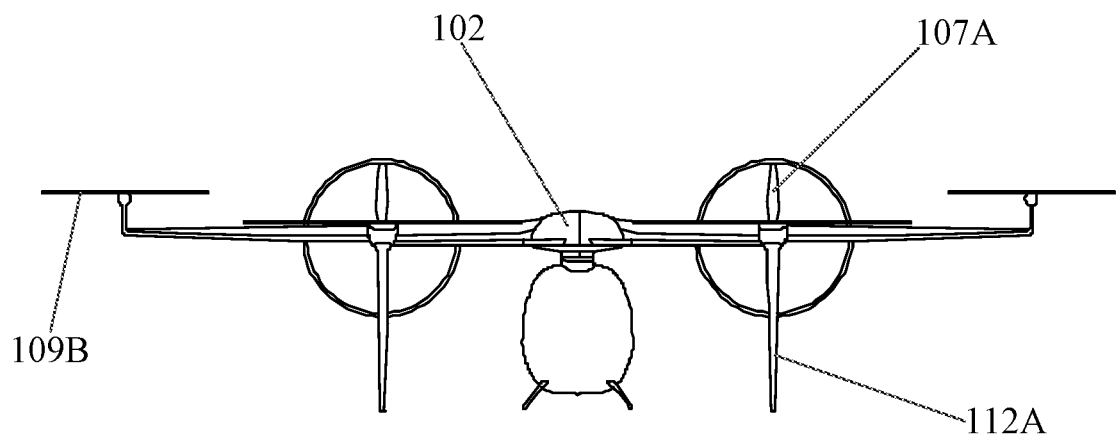
FIG. 8 is a front view of the unmanned aircraft system of FIG. 7 in accordance with one aspect of the embodiment.
Figure 9:
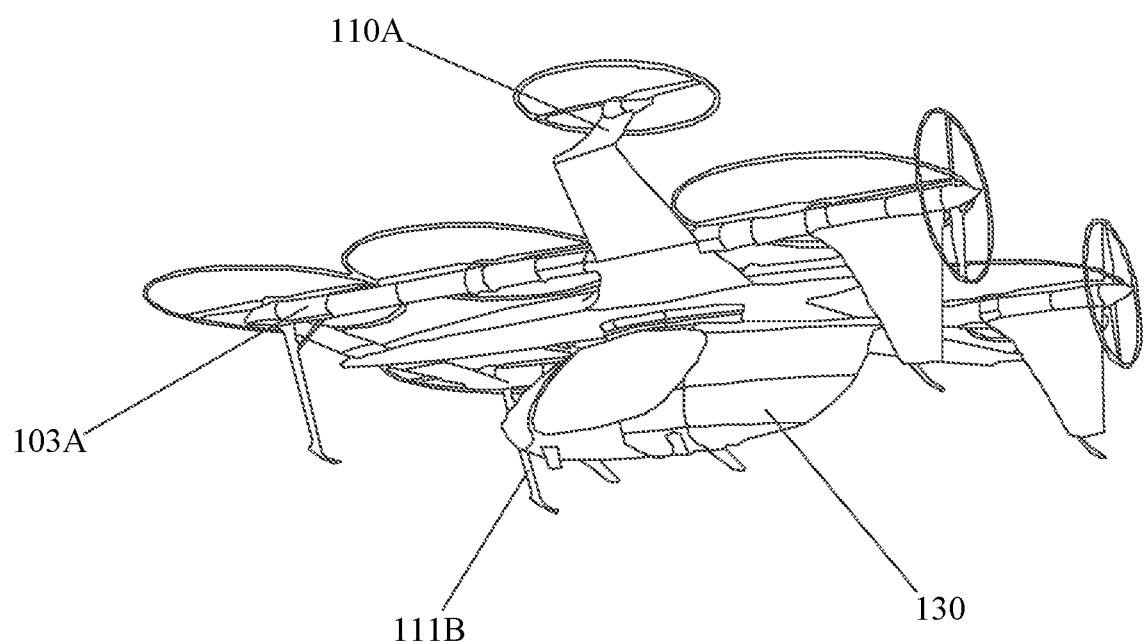
FIG. 9 is a rear perspective view of the unmanned aircraft system of FIG. 7 in accordance with one aspect of the embodiment.
Figure 10:
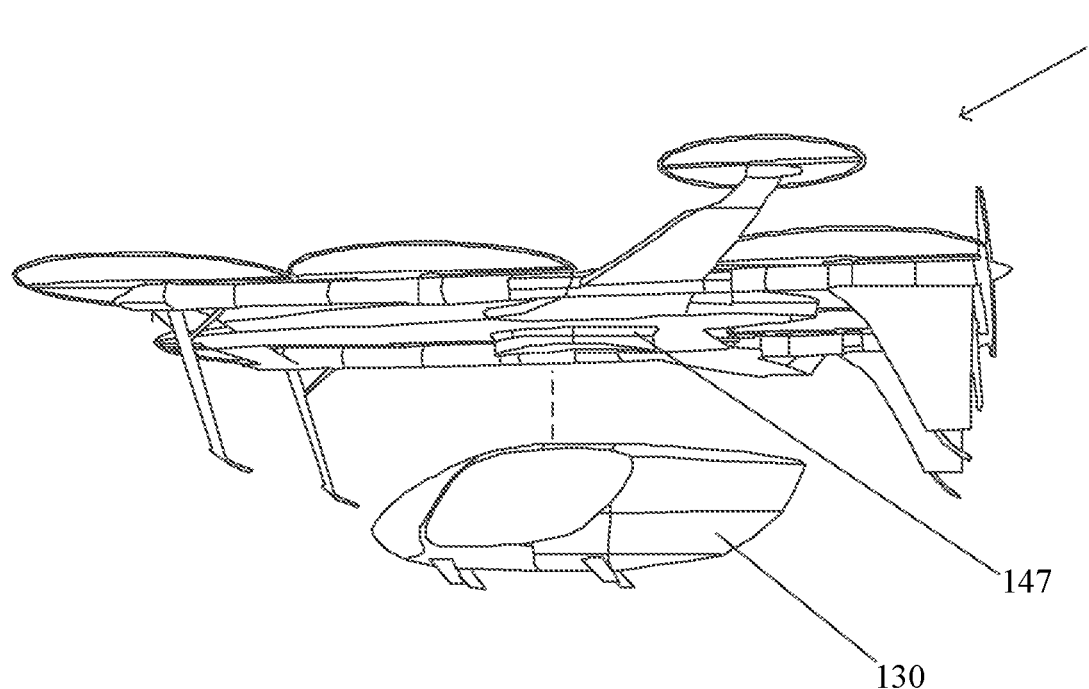
FIG. 10 is a side perspective view of the unmanned aircraft system of FIG. 7 in accordance with one aspect of the embodiment, wherein the passenger pod is detached from the flight platform and parked on the ground.
Figure 11:
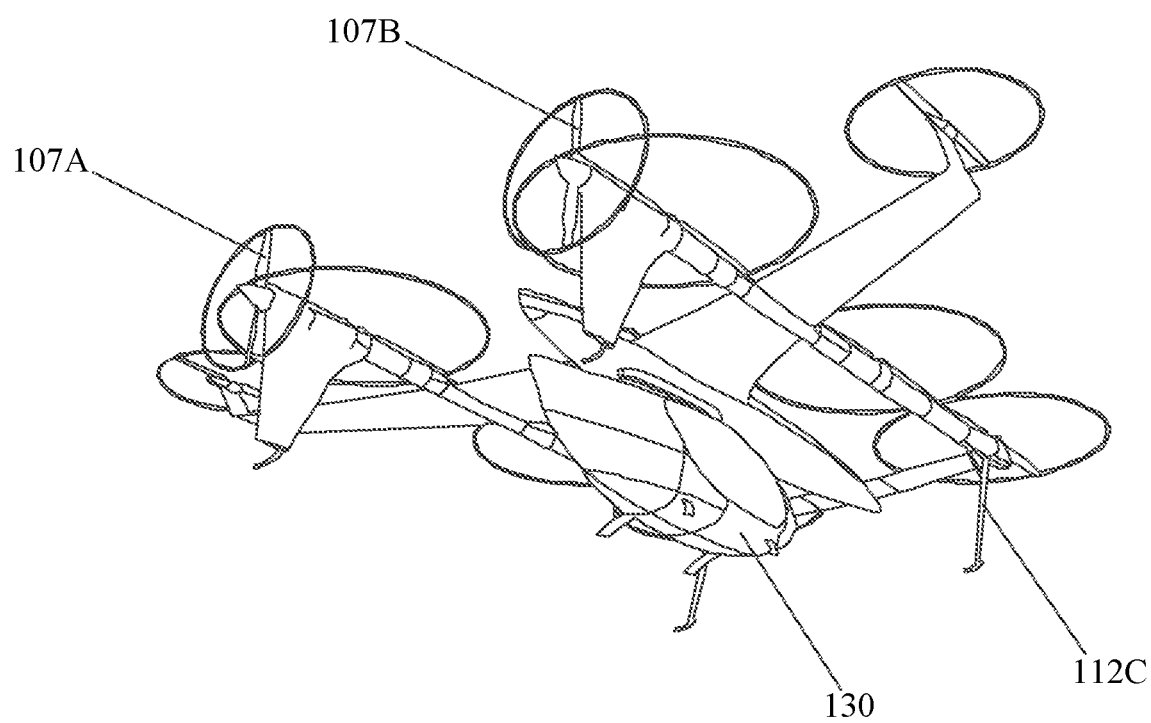
FIG. 11 is a rear perspective view of the embodiment of FIG. 7 in accordance with one aspect of the embodiment.
Figure 12:
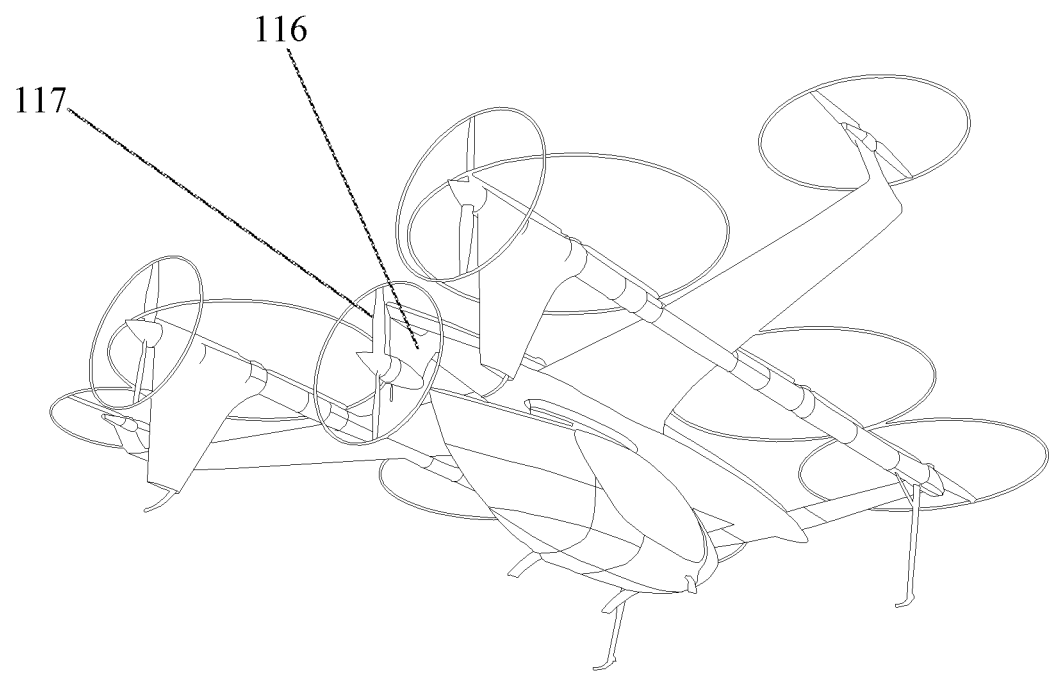
FIG. 12 is a rear perspective view of another embodiment in accordance with one aspect of the embodiment.
Figure 13:
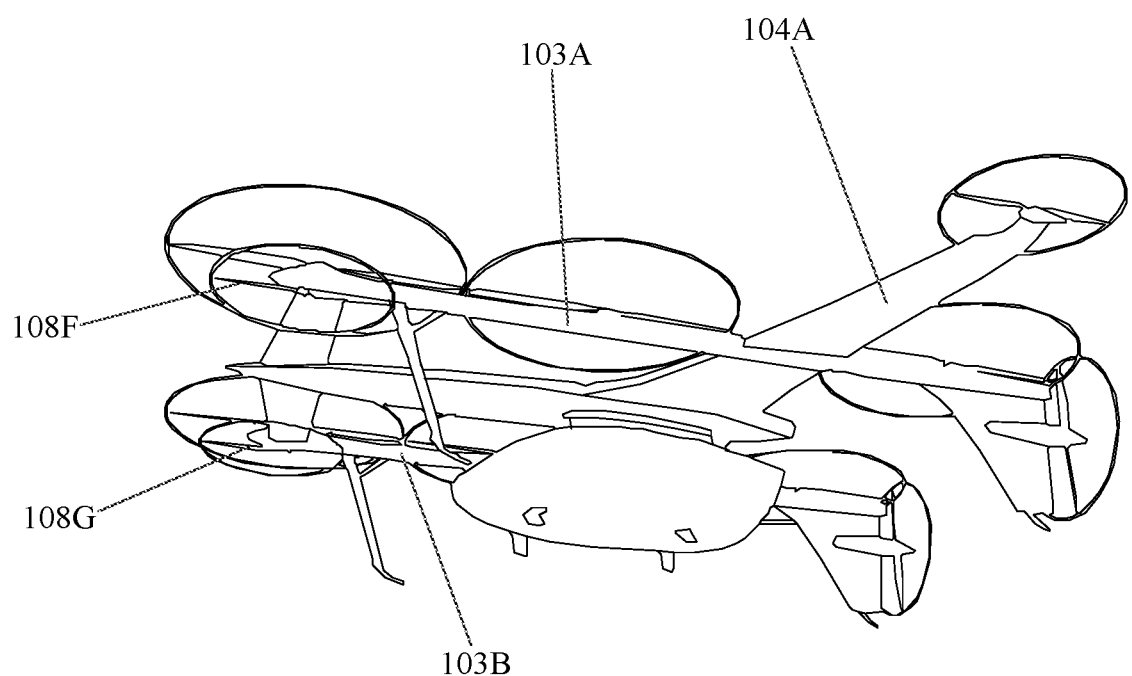
FIG. 13 is a side bottom perspective view of still another embodiment of an unmanned aircraft system in accordance with one aspect of the embodiment.
Figure 14:
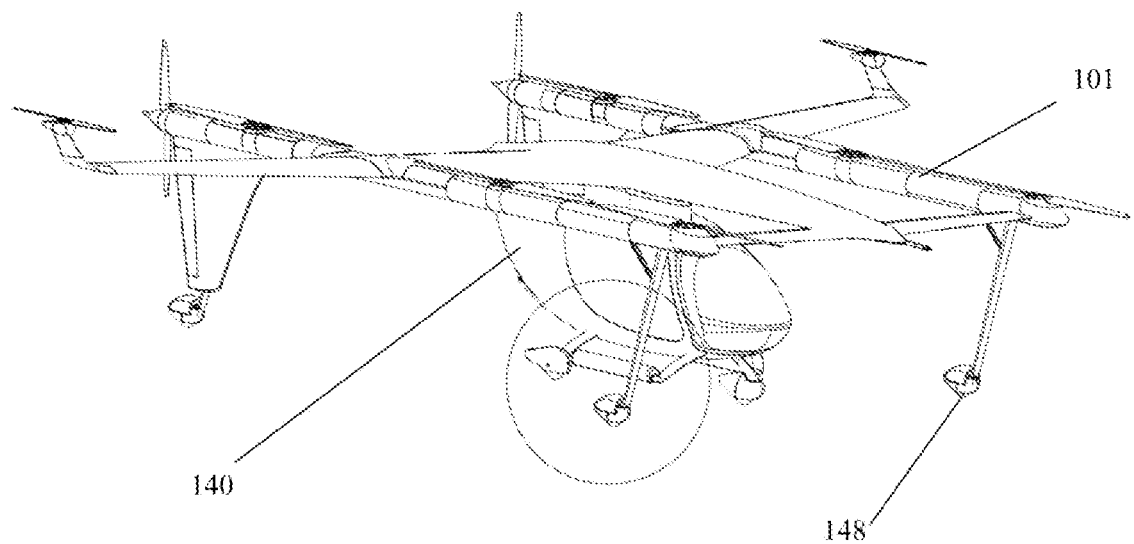
FIG. 14 is a perspective view of one embodiment of an unmanned aircraft system in accordance with another aspect of the embodiment.
Figure 15:
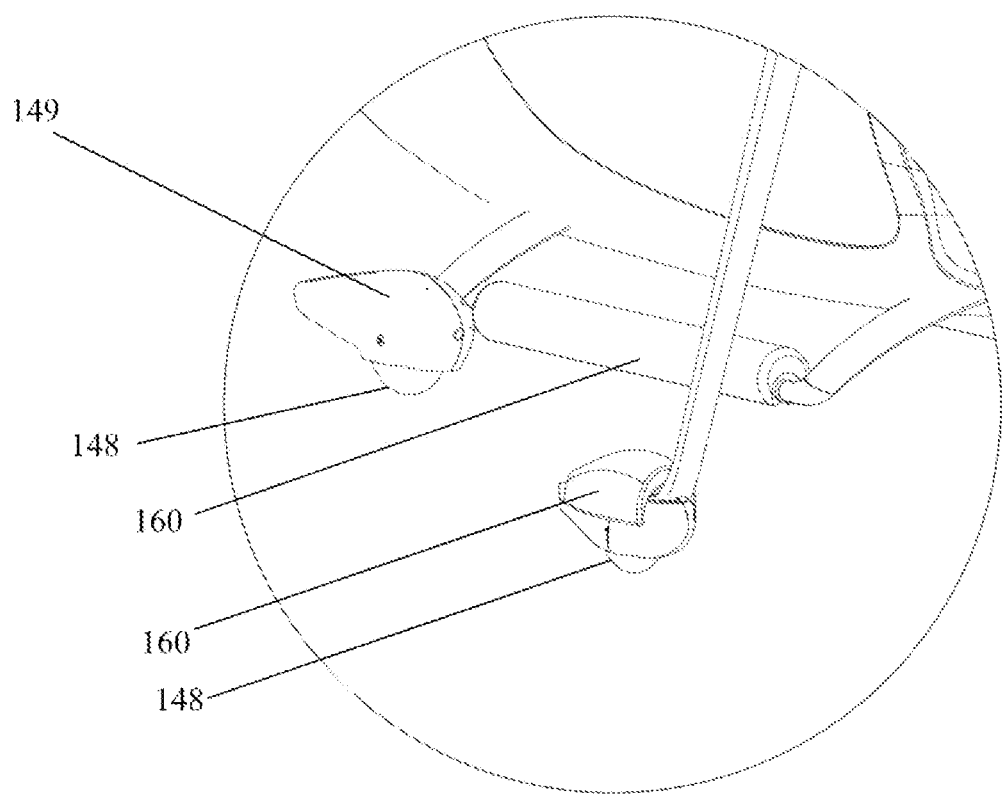
FIG. 15 is a close-up view of an encircled region in FIG. 14 in accordance with another aspect of the embodiment.
Figure 16:
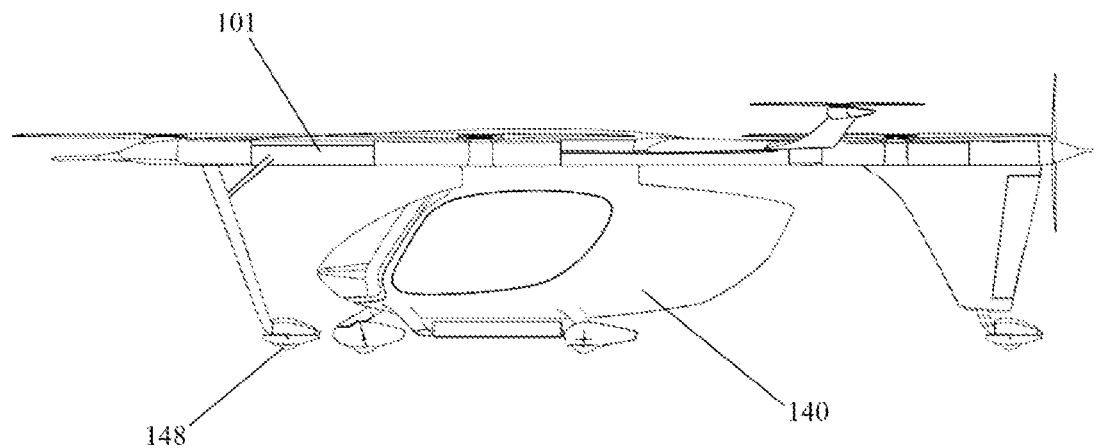
FIG. 16 is a side view of one embodiment of an unmanned aircraft system in accordance with another aspect of the embodiment.
Figure 17:
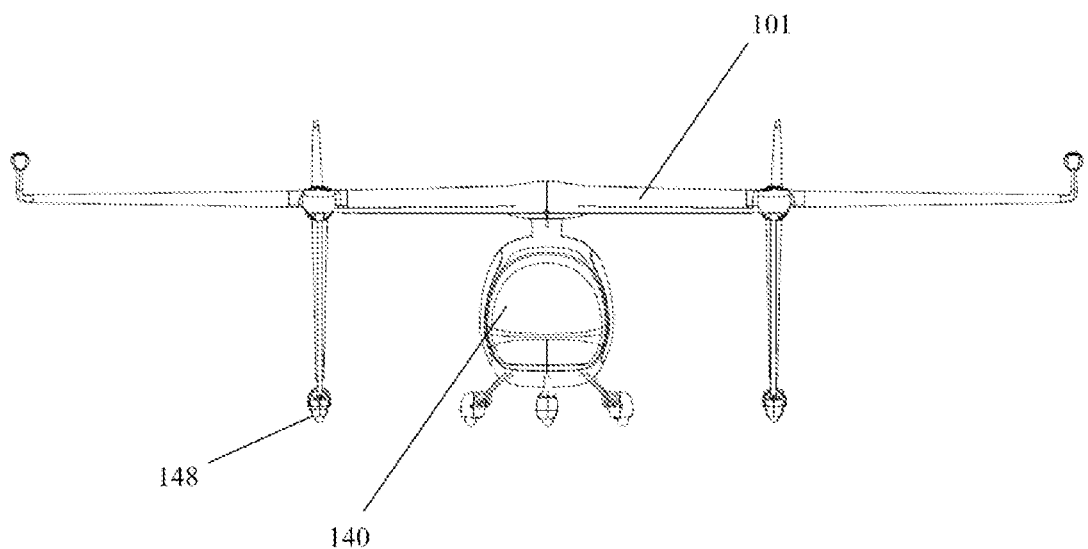
FIG. 17 is a front view of one embodiment of an unmanned aircraft system in accordance with another aspect of the embodiment.
Figure 18:
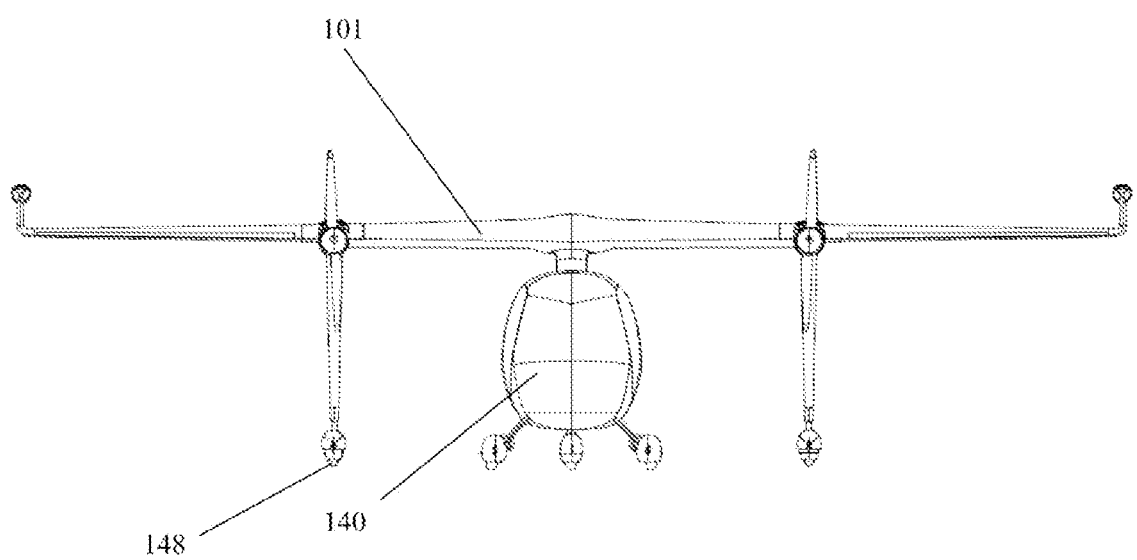
FIG. 18 is a rear view of one embodiment of an unmanned aircraft system in accordance with another aspect of the embodiment.
Figure 19:
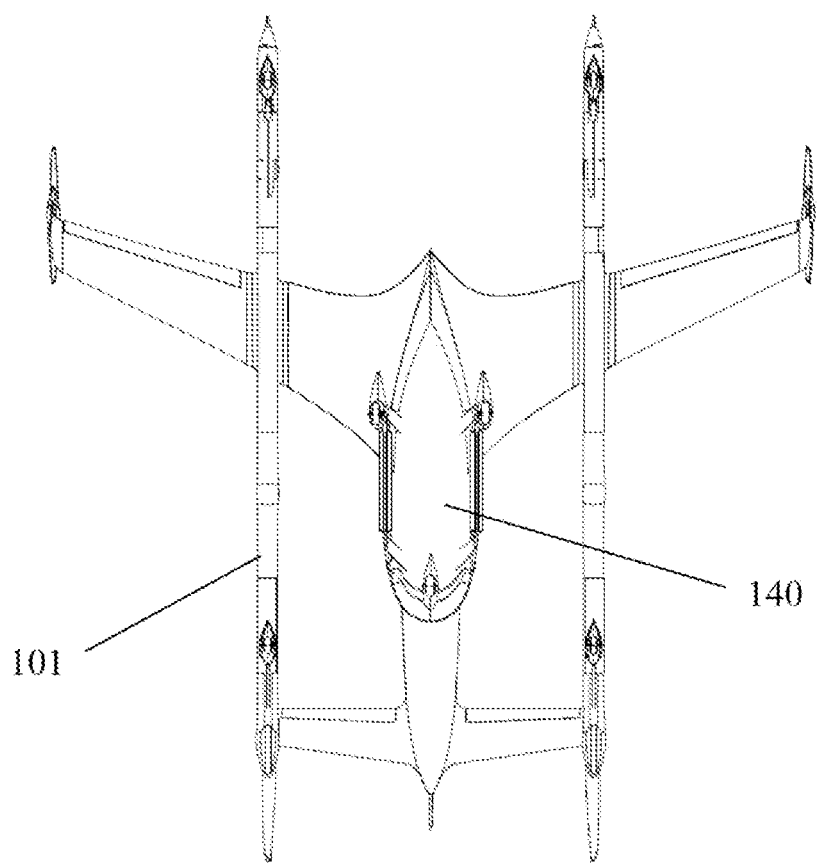
FIG. 19 is an upward view of one embodiment of an unmanned aircraft system in accordance with another aspect of the embodiment.
Figure 20:
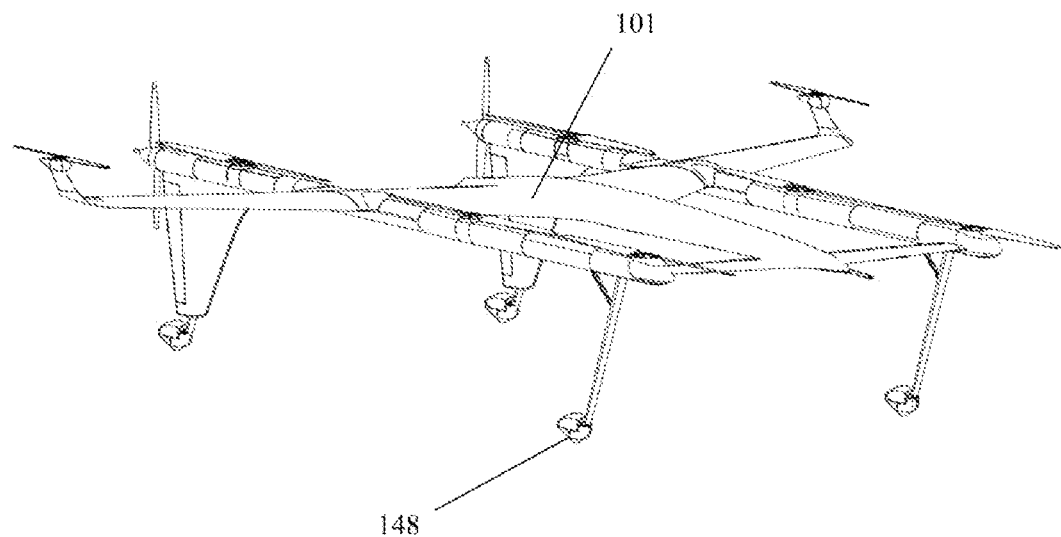
FIG. 20 is a perspective view of another embodiment of a flight platform in accordance with another aspect of the embodiment.
Figure 21:
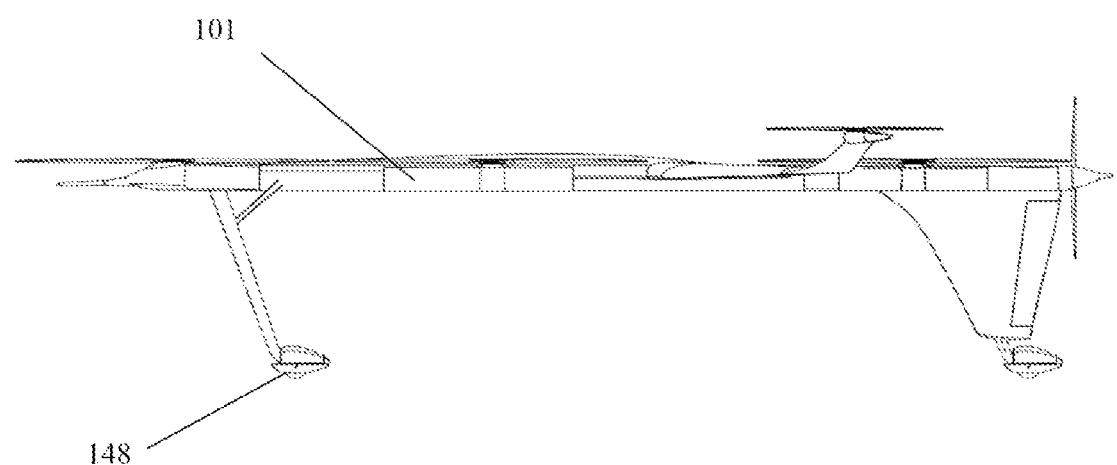
FIG. 21 is a side view of another embodiment of a flight platform in accordance with another aspect of the embodiment.
Figure 22:
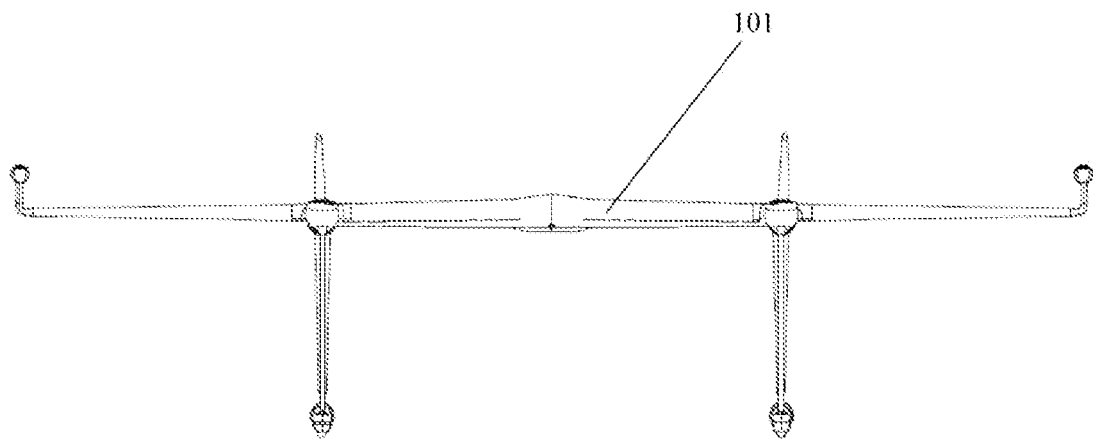
FIG. 22 is a front view of another embodiment of a flight platform in accordance with another aspect of the embodiment.
Figure 23:
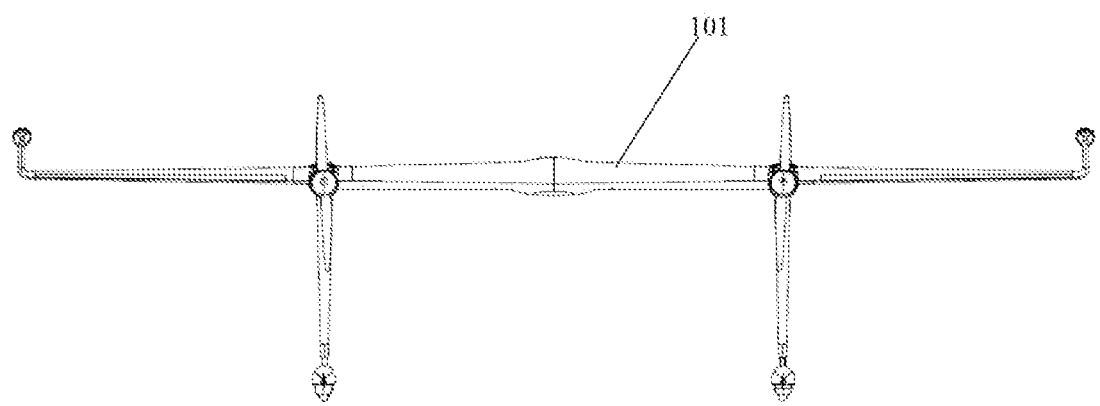
FIG. 23 is a rear view of another embodiment of a flight platform in accordance with another aspect of the embodiment.
Figure 24:
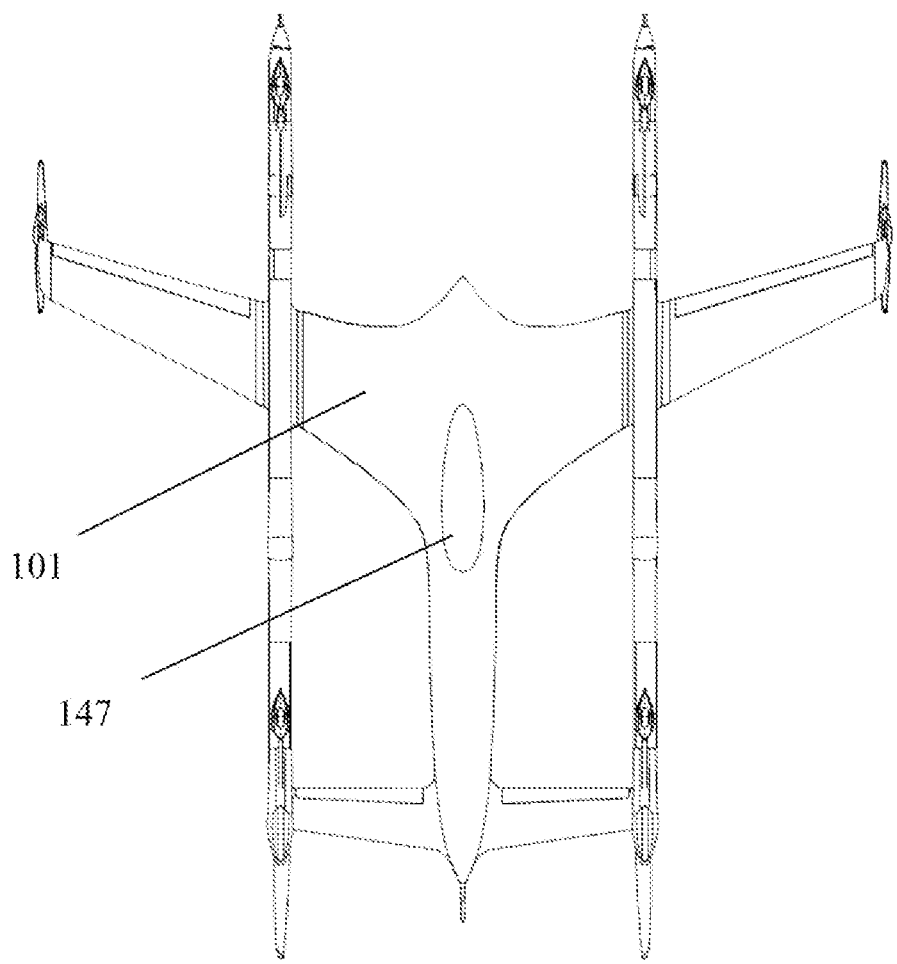
FIG. 24 is an upward view of another embodiment of a flight platform in accordance with another aspect of the embodiment.
Figure 25:
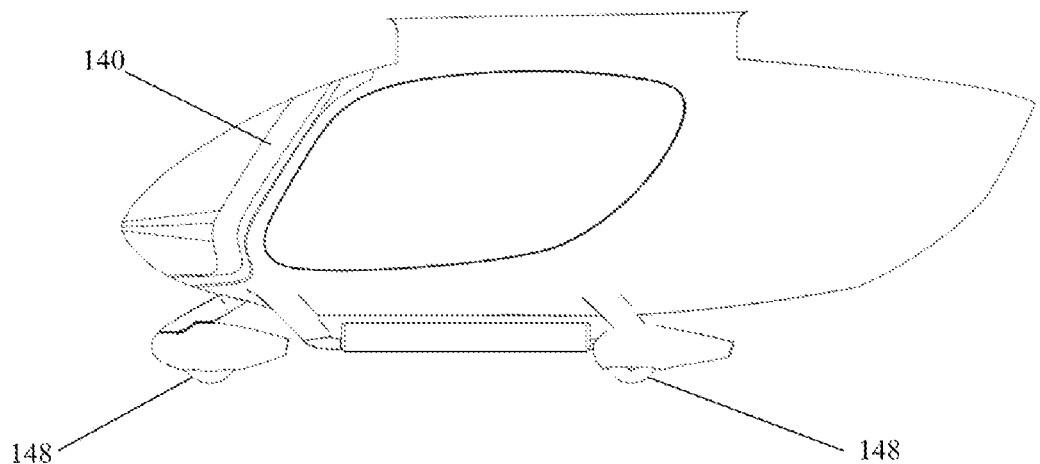
FIG. 25 is a side view of another embodiment of a passenger pod in accordance with another aspect of the embodiment.
Figure 26:
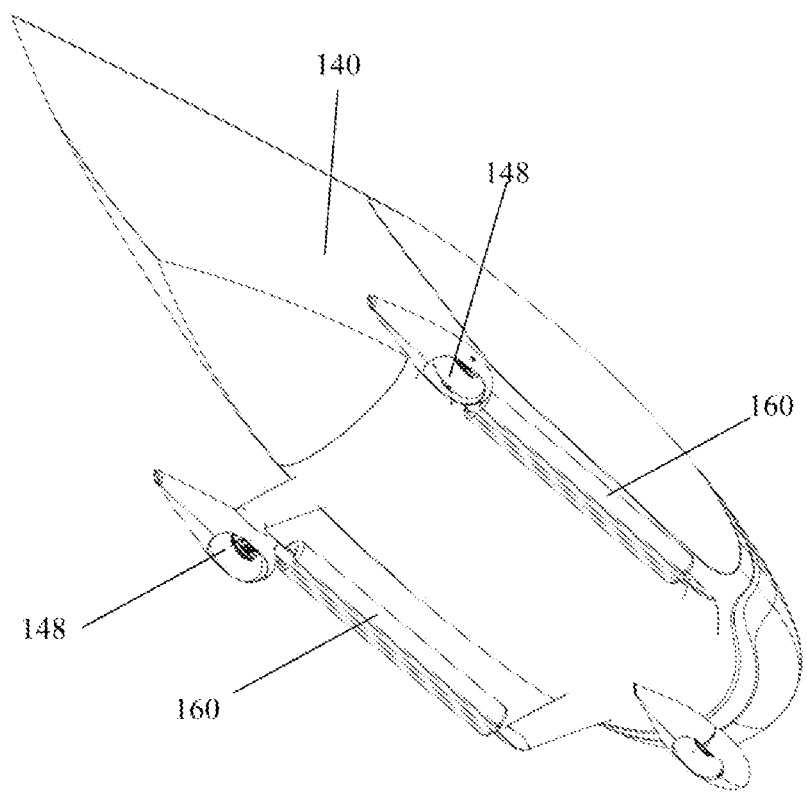
FIG. 26 is a bottom perspective view of another embodiment of a passenger pod in accordance with another aspect of the embodiment.
Figure 27:
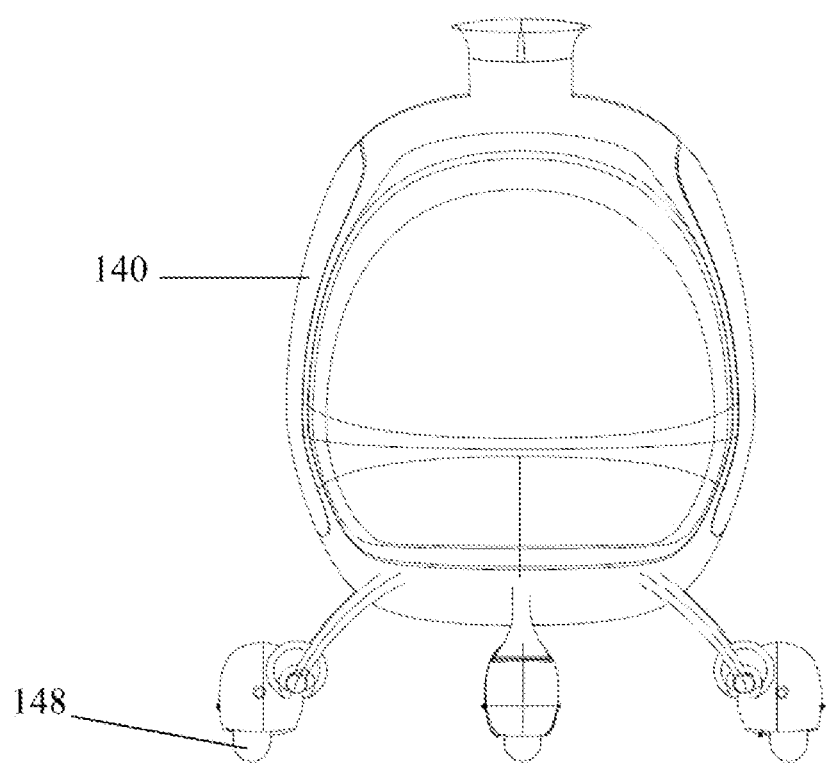
FIG. 27 is a front view of another embodiment of a passenger pod in accordance with another aspect of the embodiment.
Figure 28:
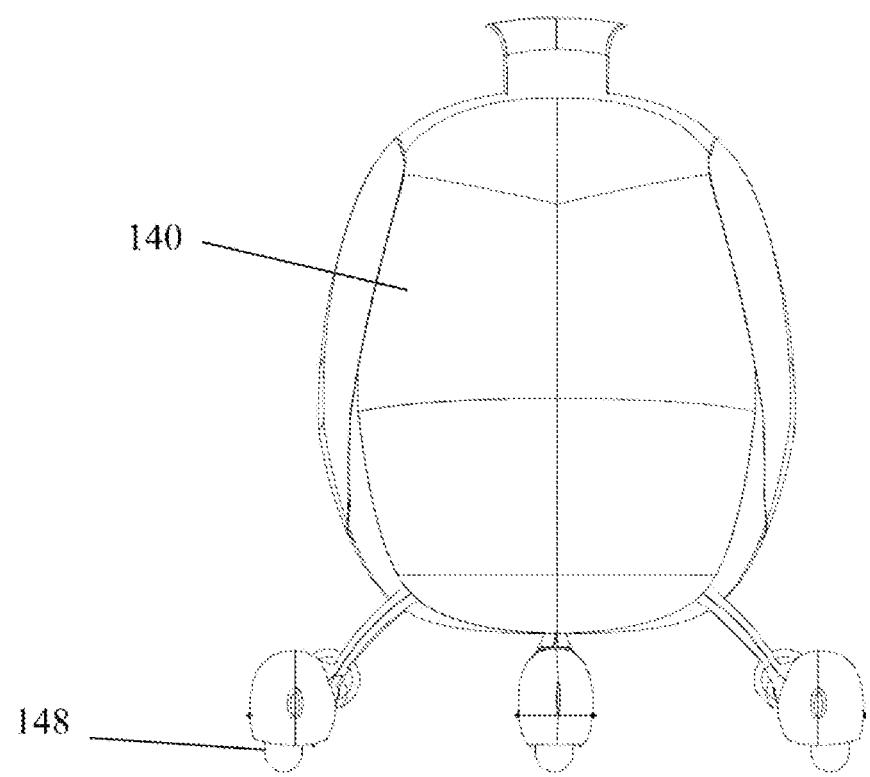
FIG. 28 is a rear view of another embodiment of a passenger pod in accordance with another aspect of the embodiment.
Figure 29:
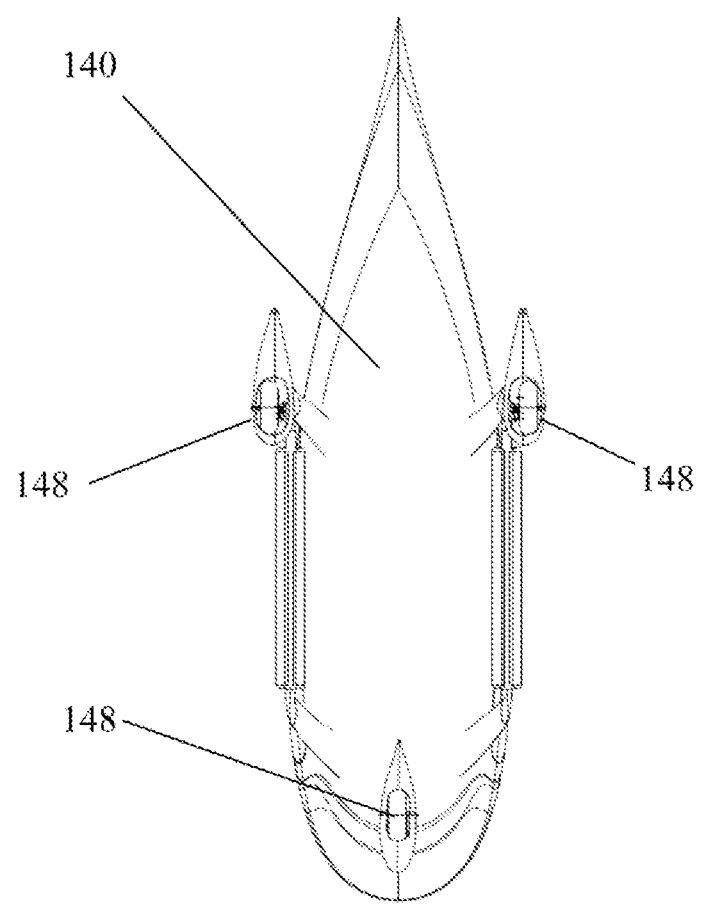
FIG. 29 is an upward view of another embodiment of a passenger pod in accordance with another aspect of the embodiment.
Figure 30:
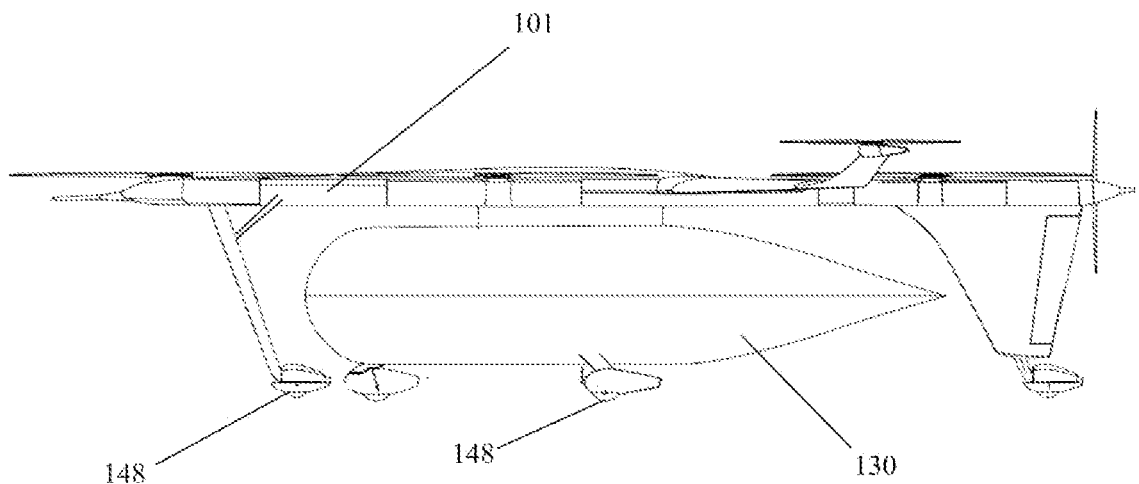
FIG. 30 is a side view of another embodiment of a flight platform attached to a cargo pod in accordance with another aspect of the embodiment.
Figure 31:
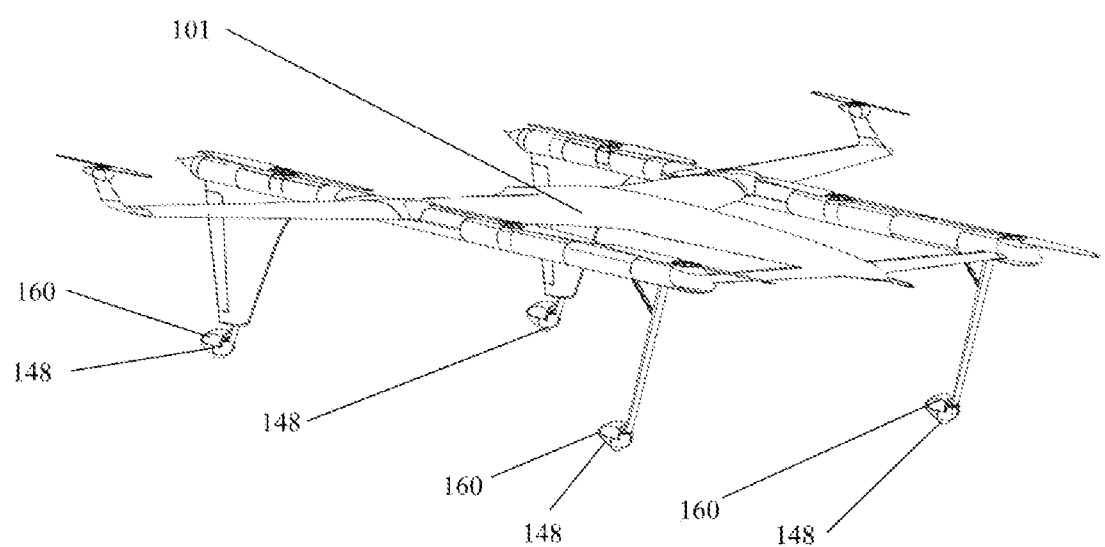
FIG. 31 is a perspective view of another embodiment of a flight platform without a propulsion propeller in accordance with another aspect of the embodiment.
Figure 32:
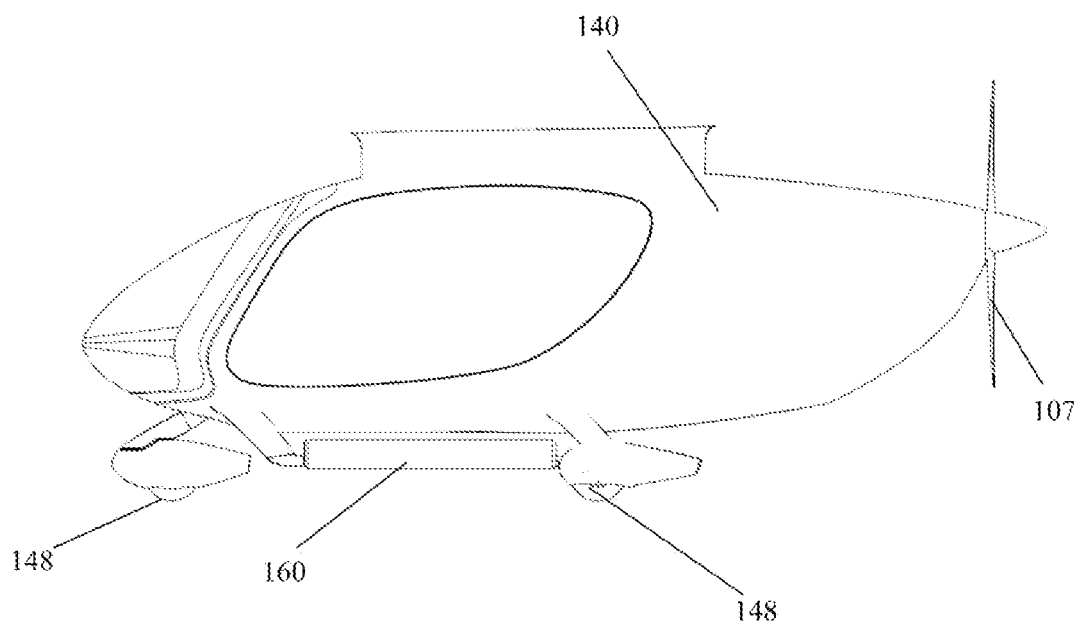
FIG. 32 is a side view of another embodiment of a passenger pod with a propulsion propeller in accordance with another aspect of the embodiment.
Figure 33:
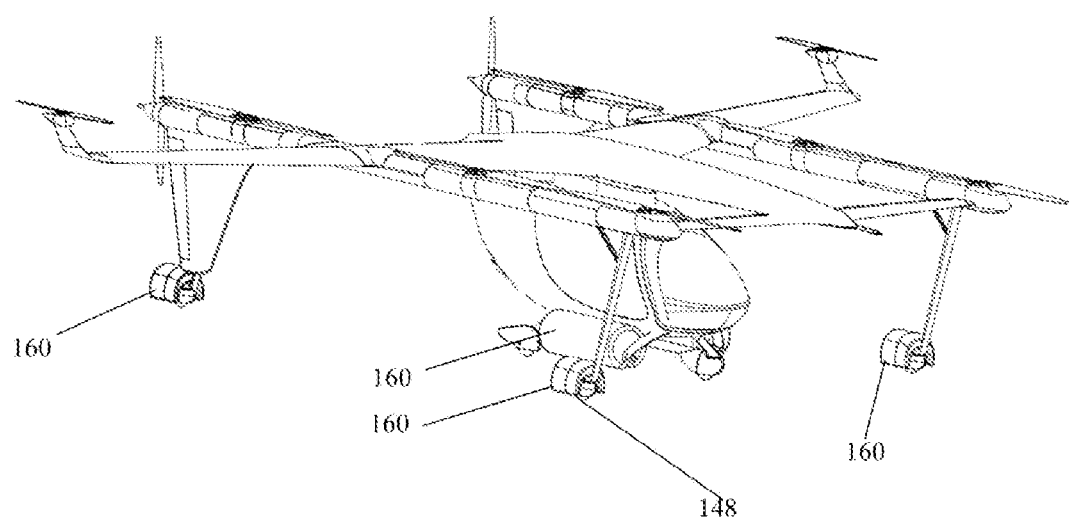
FIG. 33 is a perspective view of still another embodiment of a flight unmanned aircraft system, wherein six flotation devices are inflated.
Figure 34:
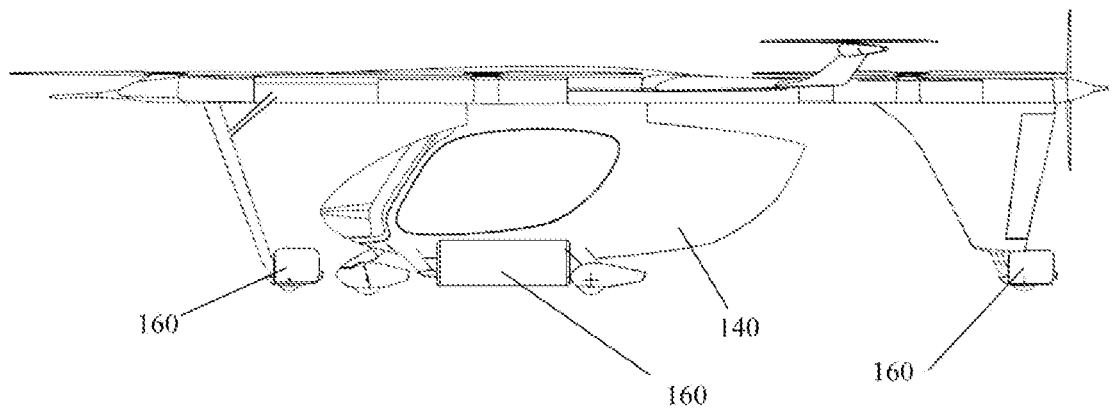
FIG. 34 is a side view of the flight unmanned aerial vehicle of FIG. 33
Figure 35:
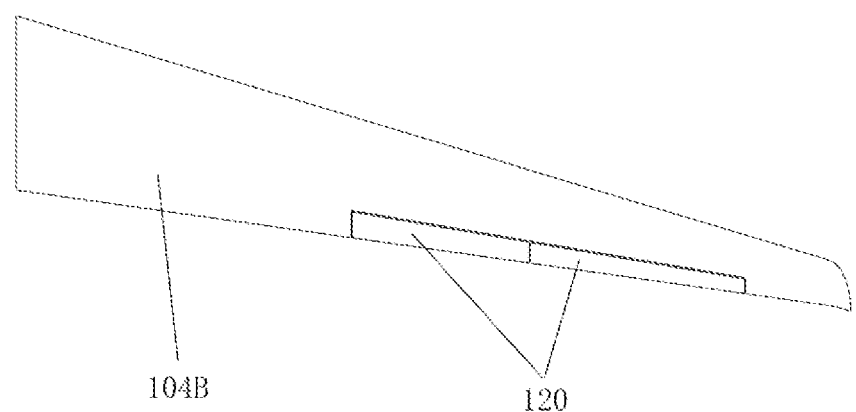
FIG. 35 is a view illustrating a configuration of ailerons of an unmanned aerial vehicle of one embodiment.

FIG. 1a is a top perspective view of an embodiment of a VTOL unmanned aircraft system in accordance with one aspect of an embodiment; FIG. 1b is a top perspective view of an embodiment of a VTOL unmanned aircraft system in accordance with still another aspect of an embodiment; FIG. 2 is a top rear perspective view of the unmanned aircraft system of FIG. 1b; FIG. 3 is a side view of the unmanned aircraft system of FIG. 1b; FIG. 4 is a top perspective view of another embodiment of an VTOL unmanned aircraft system with a flight platform and a detachably attached pod in accordance with one aspect of the embodiment; FIG. 5 is a top view of the unmanned aircraft system of FIG. 4 in accordance with one aspect of the embodiment; FIG. 6 is a front view of the unmanned aircraft system of FIG. 4 in accordance with one aspect of the embodiment; FIG. 7 is a top perspective view of an embodiment of an VTOL unmanned aircraft system with a flight platform and a detachably attached passenger pod in accordance with one aspect of the embodiment; FIG. 8 is a front view of the unmanned aircraft system of FIG. 7 in accordance with one aspect of the embodiment; FIG. 9 is a rear perspective view of the unmanned aircraft system of FIG. 7 in accordance with one aspect of the embodiment; FIG. 10 is a side perspective view of the unmanned aircraft system of FIG. 7 in accordance with one aspect of the embodiment, wherein the passenger pod is detached from the flight platform and parked on the ground; FIG. 11 is a rear perspective view of the embodiment of FIG. 7 in accordance with one aspect of the embodiment; FIG. 12 is a rear perspective view of another embodiment in accordance with one aspect of the embodiment; FIG. 13 is a side bottom perspective view of still another embodiment of an unmanned aircraft system in accordance with one aspect of the embodiment; FIG. 14 is a perspective view of one embodiment of an unmanned aircraft system in accordance with another aspect of the embodiment; FIG. 15 is a close-up view of an encircled region in FIG. 14 in accordance with another aspect of the embodiment; FIG. 16 is a side view of one embodiment of an unmanned aircraft system in accordance with another aspect of the embodiment; FIG. 17 is a front view of one embodiment of an unmanned aircraft system in accordance with another aspect of the embodiment; FIG. 18 is a rear view of one embodiment of an unmanned aircraft system in accordance with another aspect of the embodiment; FIG. 19 is an upward view of one embodiment of an unmanned aircraft system in accordance with another aspect of the embodiment; FIG. 20 is a perspective view of another embodiment of a flight platform in accordance with another aspect of the embodiment; FIG. 21 is a side view of another embodiment of a flight platform in accordance with another aspect of the embodiment; FIG. 22 is a front view of another embodiment of a flight platform in accordance with another aspect of the embodiment; FIG. 23 is a rear view of another embodiment of a flight platform in accordance with another aspect of the embodiment; FIG. 24 is an upward view of another embodiment of a flight platform in accordance with another aspect of the embodiment; FIG. 25 is a side view of another embodiment of a passenger pod in accordance with another aspect of the embodiment; FIG. 26 is a bottom perspective view of another embodiment of a passenger pod in accordance with another aspect of the embodiment; FIG. 27 is a front view of another embodiment of a passenger pod in accordance with another aspect of the embodiment; FIG. 28 is a rear view of another embodiment of a passenger pod in accordance with another aspect of the embodiment; FIG. 29 is an upward view of another embodiment of a passenger pod in accordance with another aspect of the embodiment; FIG. 30 is a side view of another embodiment of a flight platform attached to a cargo pod in accordance with another aspect of the embodiment; FIG. 31 is a perspective view of another embodiment of a flight platform with a propulsion propeller in accordance with another aspect of the embodiment; FIG. 32 is a side view of another embodiment of a passenger pod with a propulsion propeller in accordance with another aspect of the embodiment; FIG. 33 is a perspective view of still another embodiment of a flight unmanned aircraft system, wherein six flotation devices are inflated; FIG. 34 is a side view of the flight unmanned aerial vehicle of FIG. 33 FIG. 35 is a view illustrating a configuration of an aileron of an unmanned aerial vehicle of one embodiment.

FIG. 1a depicts an embodiment of a VTOL unmanned aerial vehicle 100 with a front wing configuration in general. The unmanned aerial vehicle provided by the disclosure comprises a main body 102, and a left main ring 104A and a right main wing 104B, wherein the left main wing 104A and the right main wing 104B are located at two opposite sides of the main body 102 respectively and engaged with the main body 102, that is, the left main wing 104A and the right main wing 104B are located at the left side and the right side of the main body 102 respectively, and positions of the left main wing 104A and the right main wing 104B are opposite. It may be understood by those skilled in the art that the main wings are the wings with the largest horizontal sections on the two sides of a fuselage, and the unmanned aerial vehicle 100 may generate lift in the flight process, and thus the unmanned aerial vehicle 100 may fly stably in the air.

With continued reference to FIG. 1a, the unmanned aerial vehicle 100 is further provided with front wings including a left front wing 105A and a right front wing 105B, and the left front wing 105A and the right front wing 105B are respectively located on the left side and the right side of the main body 102 and engaged with the main body 102. The embodiment is not intended to limit the size of a spacing between the front wing and the main wing, and the spacing may be set by those skilled in the art according to actual needs. It may be understood by those skilled in the art that the front wings are used for controlling a flight attitude of the unmanned aerial vehicle 100, i.e., the pitch of the unmanned aerial vehicle 100.

FIG. 1a illustrates that the left main wing 104A is engaged with a left linear support 103A, and the right main wing 104B is engaged with a right linear support 103B, preferably, the left linear support 103A and the right linear support 103B are parallel to the longitudinal axis of the main body 102, and thus resistance of air to the linear supports in the flight process of the unmanned aerial vehicle 100 is reduced. It is easy to understand that the left linear support 103A and the right linear support 103B may be used for fixedly installing lift propellers and motors, thereby making a structure of the main body 102 of the unmanned aerial vehicle 100 more compact.

As shown in FIG. 1a, the left linear support 103A is provided with a left dorsal fin 170, the right linear support 103B is provided with a right dorsal fin 180, the left dorsal fin 170 and the right dorsal fin 180 are arranged in a vertical direction. It may be understood by those skilled in the art that the left dorsal fin 170 and the right dorsal fin 180 may play a role of a stabilizer, and in the flight process of the unmanned aerial vehicle 100, the stability in the flight process may be improved by the left dorsal fin 170 and the right dorsal fin 180.

In one possible implementation, the left end of the left dorsal fin 170 is obliquely arranged towards the front end of the left linear support 103A, and the length of the top end of the left dorsal fin 170 is less than that of the bottom end of the left dorsal fin 170, that is, the left dorsal fin 170 is approximately of a right triangular structure, one right-angle side of the right triangle is arranged along the axis of the left linear support 103A, and the other right-angle side of the right triangle is arranged along a vertical direction. It may be understood by those skilled in the art that the left end of the left dorsal fin 170 is obliquely arranged, and the length of the top end of the left dorsal fin 170 is greater than that of the bottom end of the left dorsal fin, and thus the resistance of the air to the left dorsal fin 170 in the flight process of the unmanned aerial vehicle 100 may be reduced, and the cruising ability of the unmanned aerial vehicle 100 is improved. Accordingly, the right dorsal fin 180 is obliquely arranged towards the front end of the right linear support 103B; the length of the top end of the right dorsal fin 180 is less than that of the bottom end of the right dorsal fin 180, and thus the resistance of the air to the right linear support 103B is reduced.

With continued reference to FIG. 1a, the tail ends of the left linear support 103A and the right linear support 103B are respectively provided with a vertical stabilizer, the vertical stabilizers are located below the left linear support 103A and the right linear support 103B respectively; specifically, the vertical stabilizers are formed as a plate-shaped structure which is vertically arranged, and the top sides of the plate-shaped structures are arranged along the axis of the left linear support 103A and the axis of the right linear support 103B. It is easy to understand that the vertical stabilizers may play a role of a stabilizer to increase the stability of the unmanned aerial vehicle 100 in the flight process. The vertical stabilizers may be arranged above the left linear support 103A and the right linear support 103B by those skilled in the art, which may also increase the stability of the unmanned aerial vehicle 100 in the flight process.

In one possible implementation, as shown in FIG. 1b, one end, away from the main body 102, of the left main wing 104A is provided with a left wingtip vertical stabilizer 110A, one end, away from the main body 102, of the right main wing 104B is provided with a right wingtip vertical stabilizer 110B, and the left wingtip vertical stabilizer 110A and the right wingtip vertical stabilizer 110B are arranged along a vertical direction and parallel to the longitudinal axis of the main body 102. It may be understood by those skilled in the art that the left wingtip vertical stabilizer 110A and the right wingtip vertical stabilizer 110B may also play a role of the stabilizer to increase the stability of the unmanned aerial vehicle 100 in the flight process.

FIG. 1a shows that the tops of the left linear support 103A and the right linear support 103B are respectively provided a plurality of lift propellers, the left dorsal fin 170 is located between two adjacent lift propellers at the top of the left linear support 130A, and the right dorsal fin 180 is located between two adjacent lift propellers at the top of the right linear support 130B. The tops of the left dorsal fin 170 and the right dorsal fin 180 are respectively provided with additional lift propellers 190A, 190B. It is easy to understand that the additional lift propellers 190A, 190B generate upward lift while rotating, and the unmanned aerial vehicle 100 may take off and land vertically through the rotation of the additional lift propellers 190A, 190B.

It should be noted that the additional lift propellers 190A, 190B and the lift propellers are designed to be redundant with each other, that is, the additional lift propellers 190A, 190B and the lift propellers are back-up to each other. Thus, when one of the additional lift propeller and the lift propeller fails, the unmanned aerial vehicle 100 may achieve vertical takeoff and land by the other one, thereby improving the reliability of the unmanned aerial vehicle 100, and reducing accident risk.

As shown in FIG. 1a, the tail end of the left linear support 103A is provided with a left propulsion propeller 107A, the tail end of the right linear support 103B is provided with a right propulsion propeller 107B, that is, the left propulsion propeller 107A and the right propulsion propeller 107B generate forward thrust force while rotating, thereby propelling the unmanned aerial vehicle 100 to fly forwards. The left propulsion propeller 107A and the right propulsion propeller 107B may be designed to be redundant with each other, thereby guaranteeing that the other one may propel the unmanned aerial vehicle 100 to fly forwards when one propulsion propeller 170 rotates.

Another aspect of the embodiment provides an unmanned aerial vehicle 100, which at least comprises: a left main wing 104A and a right main wing 104B; a left front wing 105A and a right front wing 105B; a main body 102 which is engaged with the left main wing 104A and the right main wing 104B; a left linear support 103A which is engaged with the left main wing 104A; a right linear support 103B which is engaged with the ring main wing 104B; wherein the left linear support 103A has a first group of multiple lift propellers 108A, 108B, 108C arranged thereon; wherein the right linear support 103B has a second group of multiple lift propellers 108D, 108E, 108F arranged thereon; a left dorsal fin 170 which is arranged between any two lift propellers in the first group of multiple lift propellers on the left linear support 103A; and a right dorsal fin 180 which is arranged between any two lift propellers in the second group of multiple lift propellers on the right linear support 103B.

By adopting the unmanned aerial vehicle provided by the disclosure, by arranging the plurality of lift propellers and the left dorsal fin and the right dorsal fin, the reliability of the unmanned aircraft system is improved, the service life is prolonged, and maintenance difficulty and cost are reduced.

FIG. 1b likewise depicts still another embodiment of a VTOL unmanned aerial vehicle 100 with a front wing configuration in general. The unmanned aerial vehicle structures shown in FIG. 1a and FIG. 1b are partially identical.

The part features of the unmanned aerial vehicle shown in the accompanying drawings of the disclosure, which are illustrative only, may be freely combined.

In FIG. 1b, the unmanned aerial vehicle 100 may have two main wings 104A, 104B as a left main wing and a right main wing, and two front wings as a left front wing 105A and a right front wing 105B. The two main wings 104A, 104B and the two front wings 105A, 105B may be attached to a main body 102, wherein the main body may be positioned along a central longitudinal line of the unmanned aerial vehicle 100. The unmanned aerial vehicle 100 may also have a left linear support 103A arranged parallel to the main body 102, which may connect the left main wing 104A to the left front wing 105A. Similarly, the unmanned aerial vehicle 100 may also have a right linear support 103B arranged parallel to the main body 102, which may connect the right main wing 104B to the right front wing 105B. Wherein the front wings of the unmanned aerial vehicle mainly control a flight attitude of the unmanned aerial vehicle during the flight period, such as controlling the pitch of the unmanned aerial vehicle. The main wings of the unmanned aerial vehicle, acting as the largest wings at the two sides of a fuselage, are usually used for generating lift to support the unmanned aerial vehicle to fly in the air, and meanwhile, certain stabilization and manipulation effects are achieved.

In still another embodiment, the unmanned aerial vehicle 100 may also not have the front wing configuration. Illustratively, the unmanned aerial vehicle 100 may have two main wings as a left main wing and a right main wing, and two ailerons as a left aileron and a right aileron, all of which are engaged together to form a flight platform.

In one embodiment, as shown in FIG. 3S, the aileron 120 of the unmanned aerial vehicle may be arranged at a rear side of the main wing 104B, there may be at least one aileron, preferably two, which is in a sheet-like configuration, and capable of moving up and down to control the roll of the unmanned aerial vehicle.

The left linear support 103A and the right linear support 103B are expected to improve the structural integrity of the unmanned aerial vehicle 100. In other embodiments, the left linear support 103A and the right linear support 103B may accommodate a driving motor (not shown) for driving each of the lift propellers 108A, 108B, 108C, 108D, 108E, and 108F. Thus, the left linear support 103A and the right linear support 103B may be used for fixing the lift propellers to reduce usage of the parts of the unmanned aerial vehicle, and while simplifying structural parts of the unmanned aerial vehicle, the overall strength of the unmanned aerial vehicle may be improved due to the engagement of the left linear support 103A and the right linear support 103B with the two front wings and the two main wings. As will be disclosed later, the left linear support 103A and the right linear support 103B may also accommodate folding legs 111, each of which may be retracted into the left linear support 103 A and the right linear support 103B respectively.

In one embodiment, the left linear support 103A and the right linear support 103B are attached to the distal ends of the left front wing 105A and the right front wing 105B respectively. In still another embodiment, the left linear support 103A and the right linear support 103B extend beyond the front wings 105A, 105B.

In one embodiment, the left linear support 103A and the right linear support 103B are attached to positions near the middle portions of the left main wing 104A and the right main wing 104B respectively. In still another embodiment, the left linear support 103A and the right linear support 103B extend beyond the main wings 104A, 104B along a backwards direction.

The left linear support 103A is expected to be relative narrow in diameter, and may have a first group of multiple lift propellers 108A, 108B, 108C arranged on the top side, the bottom side, or both, of the left linear support 103A. In one feasible embodiment, these lift propellers 108A, 108B, 108C may be driven by low profile motors arranged in a hollow interior of the left linear support 103A. In an embodiment shown in FIG. 1b, the lift propellers 108A, 108B, 108C are only arranged at the top side of the left linear support 103A. It should be noted that the number of the lift propeller shown in the figure is for illustrative purpose only, the disclosure is not intended to limit the number of the lift propeller, and the lift propeller may be increased or decreased according to the demand in actual. Likewise, the right linear support 103B is expected to be relative narrow in diameter, and may have a second group of multiple lift propellers 108D, 108E, and 108F arranged on the top side, the bottom side, or both, of the right linear support 103B. In one feasible embodiment, these lift propellers 108D, 108E, 108F may be driven by low profile motors arranged in a hollow interior of the right linear support. In an embodiment shown in FIG. 1b, the lift propellers 108D, 108E, 108F are only arranged at the top side of the right linear support 103B. It should be noted that the number of the lift propeller shown in the figure is for illustrative purpose only, the disclosure is not intended to limit the number of the lift propeller, and the lift propeller may be increased or decreased according to the demand in actual.

In one embodiment, as shown in FIG. 1a, the unmanned aerial vehicle 100 may have a left dorsal fin 170 and a right dorsal fin 180, wherein the left dorsal fin 170 is arranged between any two lift propellers in the first group of multiple lift propellers 108A, 108B, 108C on the left linear support 103A; and the right dorsal fin 180 is arranged between any two lift propellers in the second group of multiple lift propellers 108D, 108E, 108F on the right linear support 103B. By arranging the lift propellers on the left dorsal fin and the right dorsal fin, the entire structure of the unmanned aerial vehicle is more compact, the structural weight is reduced, and thus the cruising power is reduced, and the endurance is increased.

In one embodiment, the unmanned aerial vehicle 100 may further comprises at least one propulsion propeller 107, which is arranged at the tail end of the unmanned aerial vehicle 100, and a rotating shaft of each of the propulsion propellers 107A, 107B in at least one propulsion propeller 107 is parallel to the longitudinal axis of the unmanned aerial vehicle 100. The cruising ability and the endurance of the unmanned aerial vehicle can be increased by adopting the propulsion propellers to provide the power.

In one embodiment, the unmanned aerial vehicle 100 may comprise two propulsion propellers 107A and 107B, one of which is arranged at the tail end of the left linear support 103A, and the other one is arranged at the tail end of the right linear support 103B. The power provided by adopting the two propulsion propellers is more abundant, and the reliability is higher compared to the arrangement of the single propulsion propeller.

In one embodiment, the left dorsal fin 170 and the right dorsal fin 180 respectively have additional lift propellers 190A and 190B arranged thereon. By arranging the additional lift propellers on the left dorsal fin and the right dorsal fin, the entire structure of the unmanned aerial vehicle is more compact in layout, the total weight is reduced, and thus the power is reduced, the endurance and the operation efficiency are improved.

In one embodiment, the additional lift propellers 190A and 190B respectively arranged on the left dorsal fin 170 and the right dorsal fin 180 are respectively arranged on the top tail ends of the left dorsal fin and the right dorsal fin. Such arrangement of the additional lift propellers may provide the lift better to maintain the stability of the vertical takeoff and landing of the unmanned aerial vehicle.

In one embodiment, base portions of the left dorsal fin 170 and the right dorsal fin 180 at least partially overlap with the left main wing and the right main wing respectively. The base portions of the left dorsal fin and the right dorsal fin and the left main wing and the right main wing are overlapped, or integrally formed, and thus shape resistance of the unmanned aerial vehicle is smaller, the structural strength is higher, and the stability and the reliability are improved.

In one embodiment, the left dorsal fin 170 and a right dorsal fin 180 each have a backward inclined plane. It can be seen in FIG. 1a that left dorsal fin 170 and the right dorsal fin 180 are in an inclined backward extending configuration, which may reduce air resistance and improve heading stability of the unmanned aerial vehicle.

In one embodiment, the additional lift propeller arranged at each of the left dorsal fin 170 and the right dorsal fin 180 has a rotation coverage area, and the rotation coverage area partially overlaps with a rotation coverage area of the lift propeller which is immediately behind the respective dorsal fin and arranged on the corresponding left linear support or right linear support respectively. It can be seen in FIG. 1a that the rotation coverage areas of the additional lift propellers 190A and 190B respectively overlap with those of the lift propellers 180C and 180F, such arrangement is in favor of reducing the cruising power of the unmanned aerial vehicle and increasing the endurance.

In one embodiment of the disclosure, the unmanned aerial is integrally formed by a mold. A lift motor installation position and a thrust motor installation position of an existing vertical take-off and landing unmanned aerial vehicle are not integrally formed by using a composite material, and the system integration degree is low. By adopting a solution of the disclosure, most of the lift motor is embedded into a motor base of an arm through an integral forming mode of the mold, and thus the resistance is reduced.

By respectively arranging the first group of multiple lift propellers and a second group of multiple lift propellers (i.e., installing a plurality of motors) on the left linear support and the right linear support, and respectively arranging the lift propellers (installing the motors likewise) on the left dorsal fin and the right dorsal fin, due to the high placement of the motors on the left dorsal fin and the right dorsal fin, the entire structure of the unmanned aerial vehicle is more compact, the structural weight is reduced, and thus the cruising power is reduced, and the endurance is increased.

Propulsion propellers are respectively arranged at the tail ends of the left linear support and the right linear support to mainly provide power for the fixed-wing cruising flight stage of the unmanned aerial vehicle, which is higher in reliability and more abundant in power compared to a common single-engine thrust motor system that is typically located at the rear portion of the longitudinal axis of a fuselage.

The unmanned aerial vehicle provided by the disclosure provides power for an unmanned aerial vehicle through a redundant design way of multiple sets of lift power systems and multiple sets of thrust power systems, the system stability is increased, and the accident risk is reduced. By installing two sets of lift systems on a rectification dorsal fin on an arm, the entire structure layout of the unmanned aerial vehicle is more compact, the total weight is reduced, and thus the power is reduced, the endurance and the operation efficiency are improved. The unmanned aerial vehicle structure is simplified through an integrally formed design of a fuselage of the unmanned aerial vehicle, the shape resistance of the unmanned aerial vehicle is smaller, the structural strength is higher, and thus the stability and the reliability are improved. Through the redundant design of multiple sets of thrust power systems, safe flight of the unmanned aerial vehicle still can be guaranteed in the case that one set of the thrust power system fails.

The unmanned aerial vehicle 100 may have at least one propulsion propeller 107 to propel the unmanned aerial vehicle 100 in a forward direction. In one embodiment as shown in FIG. 1b, there may be two propulsion propellers 107A, 107B. The two propulsion propellers 107A, 107B may be arranged at the distal ends at the rear portions of the linear supports 103A, 103B.

In still another embodiment, such as an embodiment shown in FIG. 31, a flight platform 101 may not have a propulsion propeller. In such embodiment, the flight platform 101 may be attached to a passenger pod or a cargo pod which is provided with the propulsion propeller. FIG. 32 illustrates an embodiment of a passenger pod having a propulsion propeller arranged at the rear end thereof. When the passenger pod is attached to the flight platform 101 of FIG. 31, the propulsion propeller propels the flight platform 101 forwards.

In one embodiment, two vertical stabilizers 106A, 106B may be arranged at positions near the rear ends of the linear supports 103A, 103B respectively. Although the vertical stabilizers are shown pointing downward, there may have embodiments in which the vertical stabilizers point upward.

In another embodiment, the main wings 104A, 104B may be respectively provided with wingtip lift propellers 109A, 109B arranged at the distal ends thereof. This may be achieved by providing the wingtip vertical stabilizers 110A, 110B at the distal ends of the main wings 104A, 104B, respectively, and having the lift propellers 109 A, 109B arranged at the upper tips of the wingtip vertical stabilizers 110A, 110B. These wingtip lift propellers 109A, 109B may be relatively smaller than the lift propellers arranged on the linear supports 103A, 103B.

These wingtip lift propellers 109A, 109B may be used for efficiently and effectively controlling the roll of the unmanned aerial vehicle 100. These wingtip lift propellers 109A, 109B are located at the most distal positions away from the center axis of the unmanned aerial vehicle 100 and are effective in regulating the roll of the unmanned aerial vehicle 100, and may do so with a diameter smaller than those of the other lift propellers.

As further shown in FIG. 1b, there is a pod 130 normally attached beneath a main body 102 of the unmanned aerial vehicle 100.

Now referring to details in FIG. 2, the unmanned aerial vehicle 100 is expected to use any type of landing gear. In one embodiment, the unmanned aerial vehicle 100 may have four single leaf springs 112A, 112B, 112C, 112D as the landing gears. The front two single leaf springs 112A, 112C are respectively arranged at the distal ends of folding legs 111A, 111B. During the flight, the folding legs 111A, 111B may be respectively retracted into interior spaces of the left linear support 103A and the right linear support 103B.

The two single leaf left springs 112B, 112D at the rear side are expected to be respectively arranged at the distal ends of the bottoms of the vertical stabilizers 106A, 106B.

The expected single leaf springs 112A, 112B, 112C, 112D may be made of appropriate materials to provide enough elasticity and integrity, the materials comprise natural and synthetic polymers, various metals and metallic alloy, natural materials, textile fibers, and all reasonable combination thereof. In one embodiment, carbon fibers are used.

Now turning to FIG. 3, a pod used as a cargo pod 130 is illustrated. The cargo pod 130 may have single leaf springs 135A, 135B, 135C, 135D as landing gears thereof. Or, the cargo pod 130 may have other type of landing gear, for example, sliding rails, legs, and wheels.

In an expected embodiment, the cargo pod 130 may be detached from the other portion of the unmanned aerial vehicle 100. The other portion of the unmanned aerial vehicle may be called as a flight platform 101. The flight platform 101 may fly without carrying the pod, and may interchangeably carry different pods. As will be described later, the flight platform 101 may carry a passenger pod.

In an illustrated example, all pods 130, 140 may be carried beneath the flight platform 101. The pods 130, 140 are expected to be loaded on the ground, and the loading process may be completed before or after attaching the flight platform 101 to the pods 130, 140.

FIG. 5 illustrates a top view of the flight platform 101. The flight platform 101 may have a generally flat configuration, and capable of carrying a load therebelow or thereabove. During high-speed flight, all six lift propellers 108A, 108B, 108C, 108D, 108E, 108F may be locked in place, and thus each blade is parallel to the main body 102.

FIG. 5 illustrates one embodiment of the flight platform 101, wherein the length of each of the front wings 105A, 105B is not longer than a half of the length of each of the main wings 104A, 104B.

FIG. 6 depicts a front view of a flight platform 101 with a detachably attached cargo pod 130 in general. Whether the cargo pod 130, the passenger pod 140, or any other type of load, it is specifically expected that there may be an energy storage unit 150 arranged in the main body 102 of the flight platform. Stored energy may be used to power the other parts of the flight platform, such as the lift propellers 108A, 108B, 108C, 108D, and the propulsion propellers 107A, 107B. The stored energy may be electric power, and the storage unit is a battery. In another embodiment, the energy storage 150 may be used to power accessories in the pods 130, 140.

These batteries 150 may also be arranged in the other portions of the flight platform 101, such as in the linear support 103A, 103B.

Alternatively or preferably, there may be energy storage units 155 arranged in the pods 130, 140. Energy stored in the storage units 155 may be used to power the lift propellers 108A, 108B, 108C, 108D, and propulsion propellers 107A, 107B. The stored energy may be electric power, and the storage unit is a battery. By arranging the energy storage units 155 in the pods 130, 140, whenever the flight platform 101 is attached to new pods 130, 140, the flight platform 101 will have a supplemental energy source. The flight platform 101 itself may be an emergency energy store or a battery 150 with smaller capacity to supply power to the flight platform 101 for a relatively short period of time when the flight platform 101 is in flight without the pods 130, 140. In one embodiment, the main power supply of the flight platform 101 is from the batteries 150 located in the pods 130, 140. In this way, the flight platform 101 or the entire VTOL unmanned aircraft system 100 will have a fully charged energy source when the flight platform 101 replaces the old pods 130, 140 with the new pods 130, 140. This is a beneficial method without requiring the VTOL unmanned aerial vehicle to charge itself. In a preferred embodiment, the flight platform 101 may work/fly continuously for hours or even days to attach the cargo pod/passenger pod and detach the cargo pod/passenger pod without stopping to charge batteries thereof.

Now referring to the details of FIG. 7, a passenger pod 150 is provided. The passenger pod 150 may use any type of landing gear, such as rigid legs 145A, 145B, 145C, 145D as shown in the figure.

FIG. 10 depicts one aspect of the disclosure in general, wherein a pod (whether a cargo pod or a passenger pod) is detachable. Here, the passenger pod 140 may be selectively detached from the flight platform 101. The engagement and disengagement between the flight platform 101 and the pod 140 may be autonomously executed (without simultaneous user intervention) by a computer and/or other sensors and a calculation device. Alternatively or preferably, a user may actively control and guide the engagement and disengagement between the flight platform 101 and the pod 140.

As will be recognized by those of ordinary skill in the art, various types of engagement mechanisms 147 may be used to fix the pod 140 to the flight platform 101. For example, the engagement mechanism may be a mechanical latch, a magnetic latch, a track and groove, or a combination of any known engagement ways.

It is important to understand that, in addition to having two propulsion propellers 107A and 107B (as shown in FIG. 11), alternatively or alternatively, there may be a central propulsion propeller 117 which is connected to the rear end of the main body 102 (as shown in FIG. 12). As shown in FIG. 12, the central propulsion propeller 117 is engaged to the rear end of the main body 102 through a vertical expander 116. The vertical expander 116 may be any structure in any shape to physically engage with the propulsion propeller 117, thereby making a rotating center of the propulsion propeller 117 perpendicularly deviate from the main body 102. In still another embodiment, the propulsion propeller 117 perpendicularly deviates from the main body 102, thereby making the rotating center of the propulsion propeller 117 be perpendicularly located at a position at the rear portion of the pod 140 or be perpendicularly flushed with the pod 140. In another embodiment, the propulsion propeller 117 is perpendicularly flushed with the top of the pod 140. In another embodiment, the propulsion propeller 117 is perpendicularly flushed with the middle portion of the pod 140. In a further embodiment, the propulsion propeller 117 is perpendicularly flushed with the bottom of the pod 140.

What is not shown in any figure of the embodiment is the absence of the propulsion propellers 107A, 107B at the end parts of the linear supports 103A, 103B respectively. Instead, there may only be one propulsion propeller 117 engaged with the rear end of the main body 102.

It may also be contemplated that each of linear support 103A, 103B may comprise more than three lift propellers, which may be achieved by providing a longer linear support to accommodate more lift propellers, by using a lift propeller with smaller diameter, or by placing lift propellers on both the top and bottom sides of the linear support. One embodiment is illustrated in FIG. 13, wherein two additional lift propellers 108G 108H are arranged at the front ends of the bottoms of the linear supports 103A, 103B.

Although the propulsion propellers 107A, 107B have been illustrated in the previous figures to be positioned at the distal ends of the rear portions of the linear support 103A, 103B, it is particularly expected that these propulsion propellers 107A, 107B may be arranged at a horizontal plane lower than the main wings 104A, 104B, as those shown in FIG. 13. In one aspect, these propulsion propellers 107A, 107B may be arranged at a horizontal plane which is basically equal to pods 130, 140 carried by the flight platform. In another aspect, these propulsion propellers 107A, 107B may be arranged at the middles of the vertical stabilizers 106A, 106B. One expected reason for lowering the arrangement of the propulsion propellers 107A, 107B is to minimize head dipping effect during flight, which may be caused by aerodynamic effects caused by the pods 130, 140.

FIG. 14 to FIG. 30 illustrate an embodiment in which a flight platform 101 or pods 130, 140, or both, may each have electric wheels 148 attached thereto. In an embodiment of FIG. 14, the flight platform 101 is provided with the electric wheels 148; and each of the pods 130, 140 is also provided with the electric wheels. Now referring to an embodiment of the FIG. 15, single electric wheel 148 unit may be provided with a motor enclosed in a shell 149, and the motor may be driven the power supplied by the energy storage unit 150 arranged in the each of the pods 130, 140.

It is contemplated that the electric wheels 148 may enable the flight platform 101 or the pod 130 to move on the ground when the flight platform and the pod are parked on the ground. This allows the one of pods 130, 140 to move away from the flight platform 101 and allows another of the pods 130, 140 to move itself to the flight platform 101 for engagement.

Or, this may allow the flight platform 101 to be away from the pod 130 and to move towards another pod for engagement. In one embodiment, each of the pods 130, 140 may have an energy storage unit 155, and therefore, an energy source of the flight platform 101 is substantially supplemented when the flight platform 101 is engaged with the new and fully charged pods 130, 140.

In certain embodiments of the disclosed unmanned aircraft system, at least one flotation device 160 may be provided, which is engaged with at least one of the cargo pod 130, the passenger pod 140, and the flight platform 101. The flotation device may be of the type that requires actuation, that is, active inflation with gas or through material when needed. In other words, in this particular embodiment, the flotation device 160 may remain in a deflated state and can expand only when the inflation is triggered at certain conditions. For example, the flotation device 160 may automatically inflate during emergency landing, may automatically inflate when landing on water, and may inflate when any landing gear fails in certain aspects.

Many known types of inflation mechanisms or airbag mechanisms may be implemented to achieve the needs and configuration of the disclosed flotation device 160. The expected flotation device 160 may be of a type that can be repeatedly reused, re-inflated, and re-deflated. The expected flotation device 160 may be merely disposable.

Alternatively or preferably, an inflation behavior may be activated by a user. For example, when an operator of the unmanned aircraft system determines that the flotation device 160 needs to be inflated, he or she may send a signal to start the inflation.

It should be particularly noted in certain embodiments that the flotation device 160 does not need the electric wheel 148. In other embodiments, the flotation device 160 is a part of a shell of the electric wheel 148.

Referring to FIG. 26 as one example, a passenger pod 140 may have a lengthened type flotation device 160 arranged on any side of the pod 140, which may be used as a water landing gear. In FIG. 26, these flotation devices 160 are shown deflated. FIG. 32 illustrates a side view of a deflated flotation device 160. As shown in FIG. 33 and FIG. 34, the flotation device 160 engaged with the passenger pod 140 is shown inflated.

Referring to FIG. 31 as another example, the flight platform 101 may have four flotation devices 160 arranged on the tops of four electric wheels 148 respectively. These flotation devices 160 may be alternatively attached to the electric wheels 148 or close to the electric wheels 148 at the other positions. In FIG. 31, these flotation devices 160 engaged with the electric wheels 148 are shown deflated. FIG. 33 and FIG. 34 illustrate inflated flotation devices 160 of the flight platform 101.

According to the vertical takeoff and landing unmanned aerial vehicle provided by the disclosure, by arranging the plurality of lift propellers and the left and right dorsal fins, the reliability of the unmanned aircraft system is improved, the service life is prolonged, and maintenance difficulty and cost are reduced.

Referring to FIG. 1a and FIG. 1b, the disclosure further provides a vertical takeoff and landing unmanned aerial vehicle capable of promoting lift of the unmanned aerial vehicle without increasing a length of the unmanned aerial vehicle, which comprises: a left main wing 104A and a right main wing 104B; a left aileron and a right aileron; a main body 102 which is engaged with the left main wing 104A and the right main wing 104B; a left linear support 103A which is engaged with the left main wing 104A; a right linear support 103B which is engaged with the right main wing 104B; a first group of multiple lift propellers 108A, 108B, and 108C which are arranged on the left linear support 103A; a second group of multiple lift propellers 108D, 108E, and 108F which are arranged on the right linear support 103B, wherein the first group of multiple lift propellers 108A, 108B, and 108C and the second group of multiple lift propellers 108D, 108E, and 108F are arranged on the same first horizontal plane; a left additional lift propeller 109A which is arranged on a second horizontal plane higher than the first horizontal plane; and a right additional lift propeller 109B which is arranged on the second horizontal plane.

In one embodiment, the unmanned aerial vehicle further comprises a left dorsal fin engaged with the left linear support, and the left additional lift propeller is arranged at the top tail end of the left dorsal fin.

In one embodiment, the first group of multiple lift propellers and the left additional lift propeller are arranged in a straight line.

In one embodiment, the left additional lift propeller has a rotation coverage area, and the rotation coverage area partially overlaps with a rotation coverage area of another lift propeller in the first group of multiple lift propellers.

In one embodiment, the unmanned aerial vehicle further comprises a propulsion propeller which is arranged on the tail of each of the left linear support and the right linear support.

In one embodiment, the unmanned aerial vehicle is not provided with other lift propellers except the first group of multiple lift propellers, the second group of multiple lift propellers, the left additional lift propeller, and the right additional lift propeller.

By adopting the vertical takeoff and landing unmanned aerial vehicle provided by the disclosure, the reliability of the unmanned aircraft system may be improved, the service life may be prolonged, and the maintenance difficulty and the cost may be reduced; and the lift of the unmanned aerial vehicle is improved without increasing the length of the unmanned aerial vehicle.

Many variations and modifications may be made by those of ordinary skill in the art without departing from the spirit and scope of the disclosed embodiments. Thus, it must be understood that the illustrated embodiments are presented for the purpose of example only and should not be taken as limiting the embodiments defined by the appended technical solutions. For example, despite the fact that elements of the technical solutions are presented below in a certain combination, it must be expressly understood that the embodiment comprises other combinations of less, more or different elements, which are disclosed herein, even if such a combination is not initially defined.

Therefore, detailed embodiments and applications of a VTOL flight platform with interchangeable pods have been disclosed. However, it is apparent to those skilled in the art that more modifications in addition to those already described are possible without departing from the concepts disclosed herein. Thus, the disclosed embodiments are not limited except in the spirit of the appended technical solutions. In addition, in interpreting the specification and technical solutions, all terms should be interpreted as the broadest possible manner consistent with the context. Particularly, the terms "comprise" and "comprising" should be interpreted as referring to components, assemblies, or steps in a non-exclusive manner, indicating that the referenced components, assemblies, or steps may be present, or utilized, or combined with other components, assemblies, or steps that are not expressly referenced. Insubstantial variations from the claimed subject matter now known or later expected by those of ordinary skill in the art are expressly expected to be equivalent within the scope of the technical solutions. Thus, obvious replacements which are known at present or later to those of ordinary skill in the art are defined to be within the scope of the defined elements. Thus, the technical solutions should be understood to encompass what is specifically illustrated and described above, what is conceptually equivalent, what may be obviously replaced, and what essentially comprise the basic idea of the embodiments. In addition, in the case that the specification and technical solutions refer to at least one selected from a group consisting of A, B, C, . . . and N, the text should be interpreted as requiring at least one element of the group, including N, rather than A plus N, or B plus N, or the like.

What is claimed is:

1. A VTOL (vertical take-off and landing) aerial drone comprising:
   a left main wing and a right main wing;
   a left secondary wing and a right secondary wing;
   a main body coupled to the left main wing and the right main wing;
   a left linear support coupled to the left main wing;
   a right linear support coupled to right main wing;
   wherein the left linear support has a first set of plurality of lifting propellers disposed thereon;
   wherein the right linear support has a second set of plurality of lifting propellers disposed thereon;
   a left dorsal fin disposed between any two of said first set of plurality of lifting propellers on the left linear support and is directly connected to the left main wing;
   a right dorsal fin disposed between any two of said second set of plurality of lifting propellers on the right linear support and is directly connected to the right main wing; and
   a left extra lifting propeller disposed on a distal end of the left dorsal fin, wherein a range of motion of the left extra lifting propellers at least partially overlaps with a range of motion of an adjacent lifting propeller in said first set of plurality of lifting propellers from a top view.

2. The aerial drone as recited in claim 1 further comprising at least one push propeller disposed at a rear end of the drone, each of said at least one push propeller has a rotation of axis in parallel with a longitudinal axis of the drone.

3. The aerial drone as recited in claim 2, wherein one of said at least one push propeller is disposed at a rear end of the left linear support, and another one of said at least one push propeller is disposed at the end of the right linear support.

4. The aerial drone as recited in claim 3, wherein each of said left dorsal fin and right dorsal fin has a lifting propeller disposed thereon.

5. The aerial drone as recited in claim 4, wherein the lifting propeller disposed on each of said left dorsal fin and right dorsal fin is disposed on a top distal end of the left and right dorsal fins, respectively.

6. The aerial drone as recited in claim 4, wherein a base of each of said left and right dorsal fins at least partially overlaps with said left and right main wings, respectively.

7. The aerial drone as recited in claim 4, wherein each of said left and right dorsal fins has a rear-ward slant.

8. The aerial drone as recited in claim 4, wherein the lifting propeller disposed on each of said left dorsal fin and right dorsal fin has a rotational coverage area that partially overlaps with a rotational coverage area of the lifting propeller disposed on the respective left and right linear supports immediately behind the respective dorsal fins.

9. A method of increasing a lifting power in a VTOL aerial drone without having to lengthen the aerial drone, the method comprising:
   providing a left main wing and a right main wing on the drone;
   providing a left secondary wing and a right secondary wing on the drone;
   providing a main body coupled to the left main wing and the right main wing;
   providing a left linear support coupled to the left main wing;
   providing a right linear support coupled to the right main wing;
   providing a first set of plurality of lifting propellers disposed on the left linear support;
   providing a second set of plurality of lifting propellers disposed on the right linear support;
   wherein the first set of plurality of lifting propellers and the second set of plurality of lifting propellers are disposed on a same first horizontal plane;
   providing a left extra lifting propeller on the drone disposed on a second horizontal plane which is positioned higher than the first horizontal plane;
   providing a right extra lifting propeller on the drone disposed on the second horizontal plane;
   providing a left dorsal fin coupled to the left linear support, and the left extra lifting propeller is disposed on the top distal end of the left dorsal fin; and
   wherein said left dorsal fin is disposed between any two of said first set of plurality of lifting propellers on the right linear support and is directly connected to the left main wing;
   wherein said left extra lifting propeller has a range of motion at least partially overlaps with a range of motion of an adjacent lifting propeller in said first set of plurality of lifting propellers from a top view.

10. The method as recited in claim 9, wherein from a top view, the first set of plurality of lifting propellers and the left extra lifting propeller are disposed co-linearly.

11. The method as recited in claim 10, wherein from the top view, the left extra lifting propeller has a rotational coverage area that partially overlaps with a rotational coverage area of another lifting propeller in said first set of plurality of lifting propellers.

12. The method as recited in claim 11 further providing a push propeller disposed on a rear end of each of said left and right linear supports.

13. The method as recited in claim 11, wherein there are no other lifting propellers besides the first and second sets of plurality of lifting propellers and the left and right extra lifting propellers.

* * * * *